(12) United States Patent
Takeguchi et al.

(10) Patent No.: US 10,616,984 B2
(45) Date of Patent: Apr. 7, 2020

(54) LED LIGHTING DEVICE AND LUMINAIRE

(71) Applicant: Panasonic Intellectual Property Management Co., Ltd., Osaka (JP)

(72) Inventors: Naoki Takeguchi, Osaka (JP); Shigeru Ido, Osaka (JP); Hiroshi Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/398,658

(22) Filed: Apr. 30, 2019

(65) Prior Publication Data

US 2019/0364627 A1 Nov. 28, 2019

(30) Foreign Application Priority Data

May 23, 2018 (JP) .................................. 2018-098547

(51) Int. Cl.
*H05B 45/37* (2020.01)
*H05B 45/14* (2020.01)
*H05B 45/24* (2020.01)
*H05B 45/46* (2020.01)

(52) U.S. Cl.
CPC .............. *H05B 45/37* (2020.01); *H05B 45/14* (2020.01); *H05B 45/24* (2020.01); *H05B 45/46* (2020.01)

(58) Field of Classification Search
CPC ............ H05B 33/0815; H05B 33/0848; H05B 33/0866; H05B 33/0827

USPC .......................................................... 315/307
See application file for complete search history.

(56) References Cited

U.S. PATENT DOCUMENTS

| 8,638,045 | B2 * | 1/2014 | Kunst | H05B 33/0815 315/291 |
| 9,113,528 | B2 * | 8/2015 | Bora | H05B 33/0863 |
| 9,137,864 | B2 * | 9/2015 | Sutardja | H05B 33/0815 |
| 2004/0196225 | A1 | 10/2004 | Shimada | |
| 2008/0100232 | A1 * | 5/2008 | Miguchi | G09G 3/3413 315/294 |

FOREIGN PATENT DOCUMENTS

JP 2004-311635 A 11/2004

* cited by examiner

*Primary Examiner* — Daniel D Chang
(74) *Attorney, Agent, or Firm* — Renner, Otto, Boisselle & Sklar, LLP

(57) ABSTRACT

A light-emitting diode (LED) lighting device includes (i) a selector circuit that sequentially and cyclically selects a plurality of LED loads one by one, the plurality of LED loads respectively emitting light as a result of being selected, and (ii) a control circuit that controls the selector circuit to cause an intermediate color to be produced by successively generating frames, each frame being a temporal combination of at least one first cycle period and at least one second cycle period, the at least one first cycle period generating a first mixed emission color, and the at least one second cycle period generating a second mixed emission color different from the first mixed emission color.

15 Claims, 16 Drawing Sheets

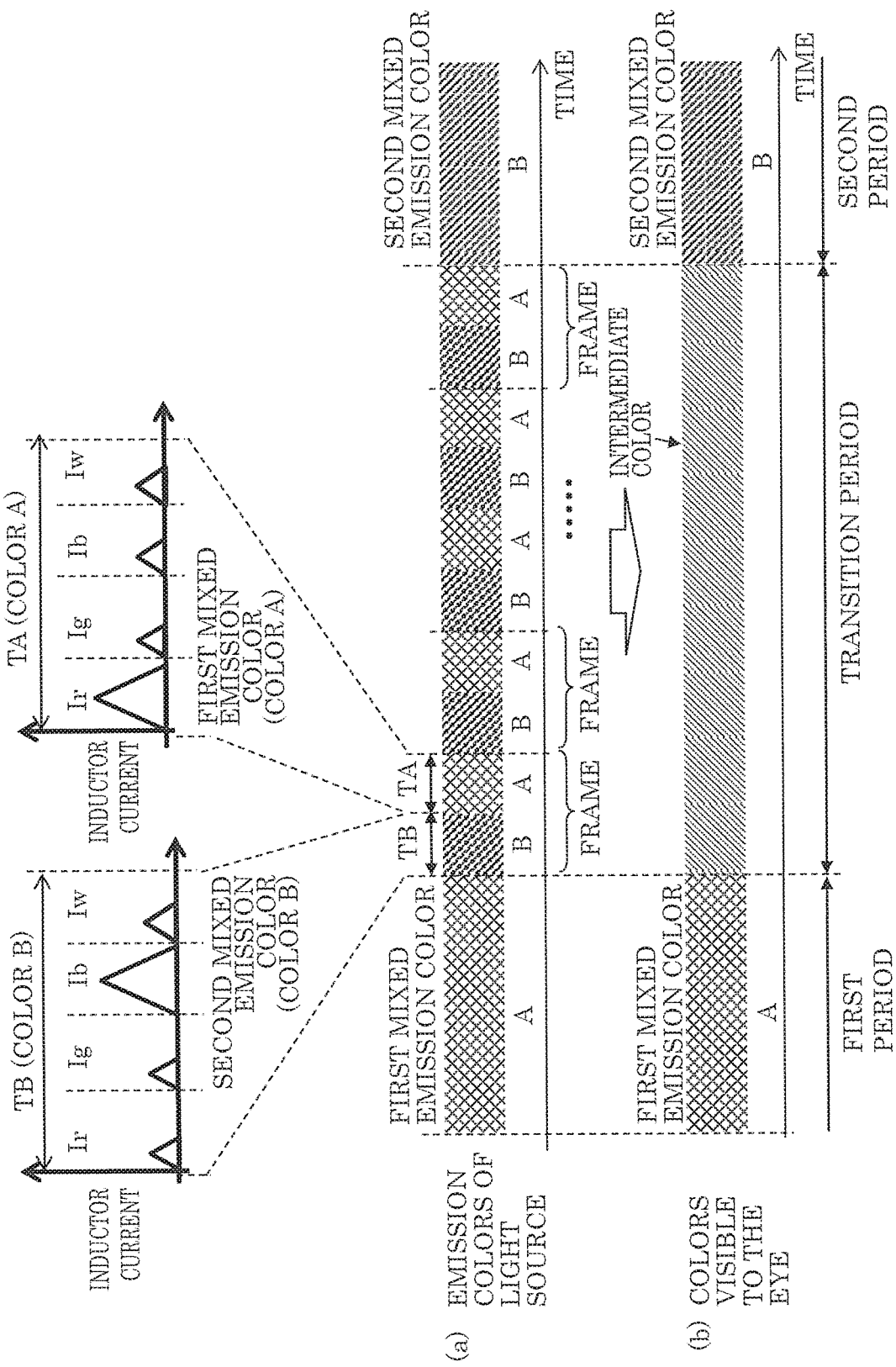

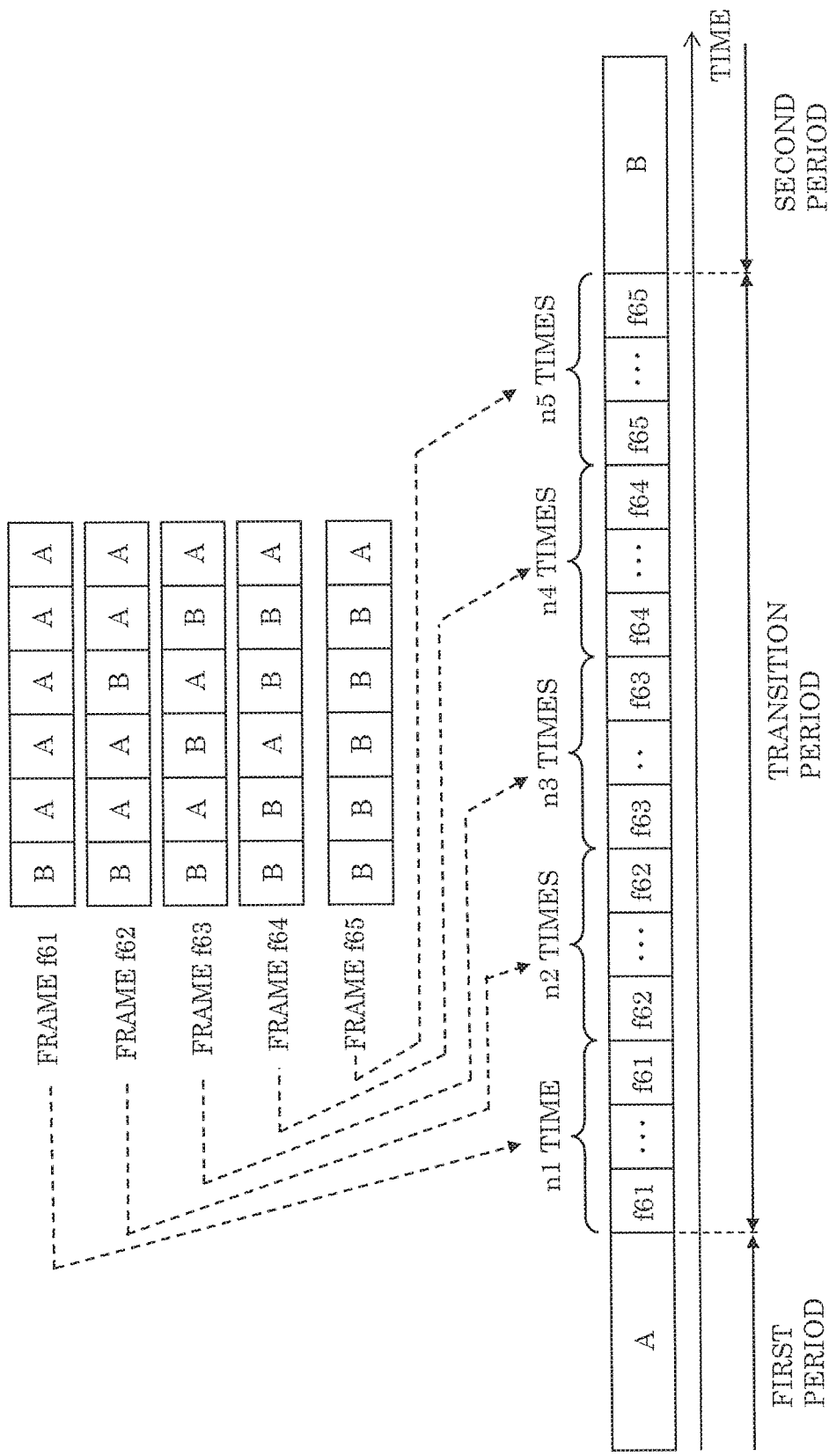

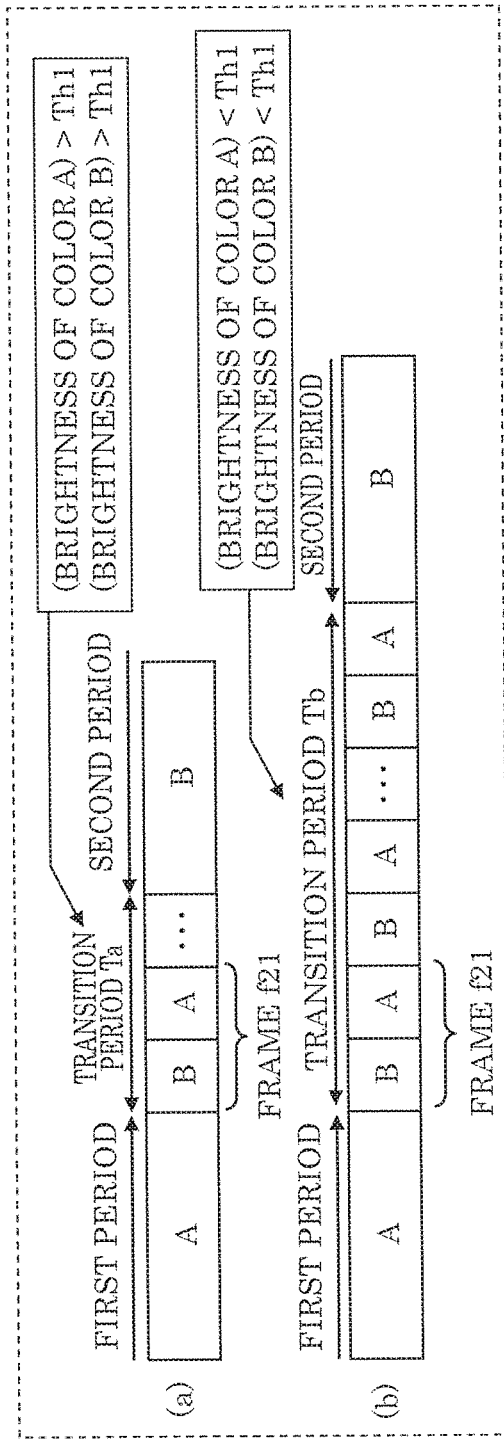
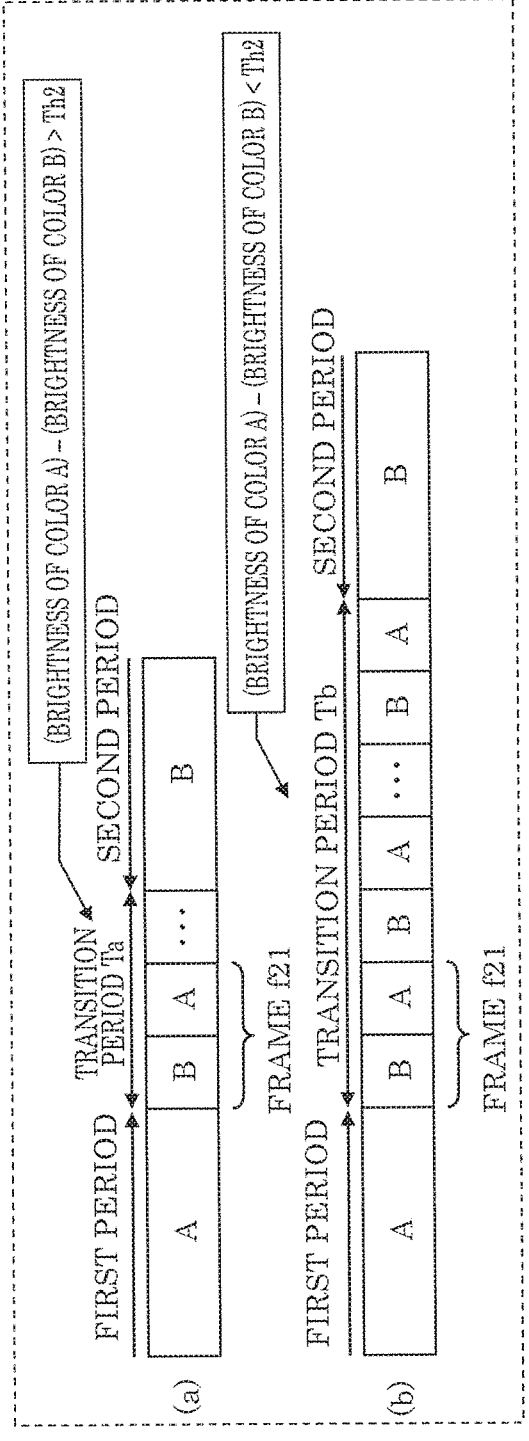

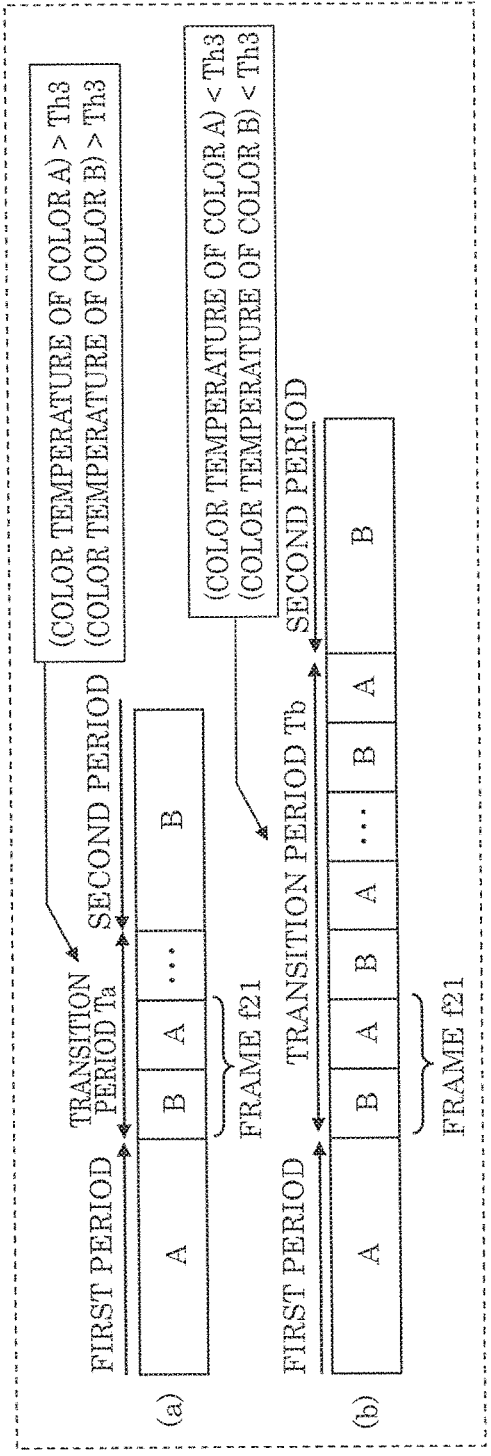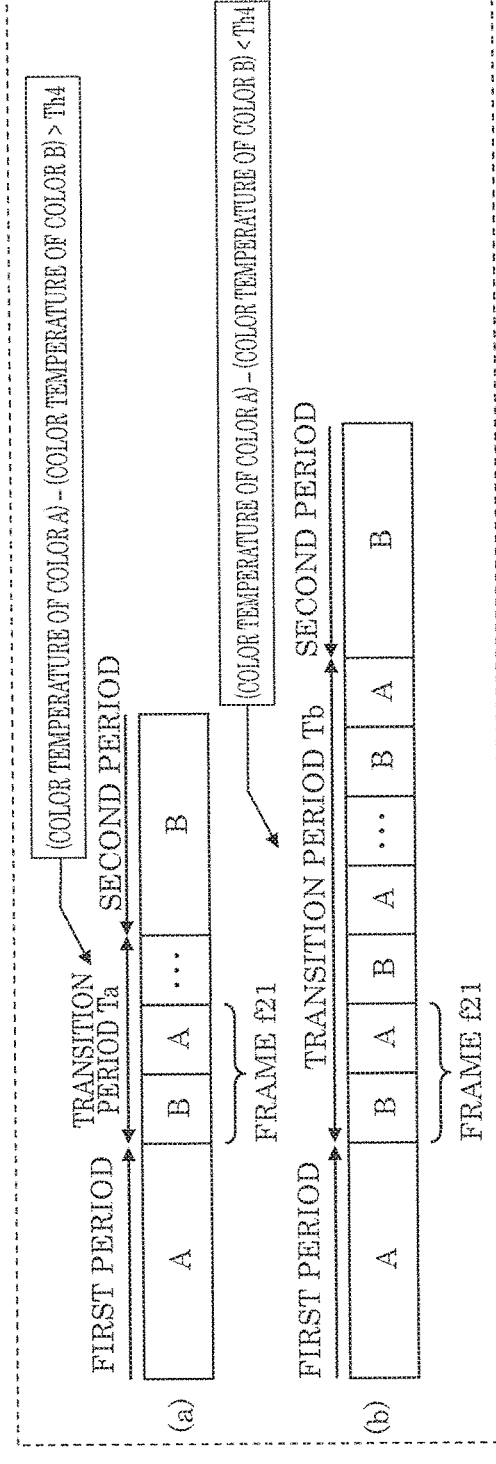

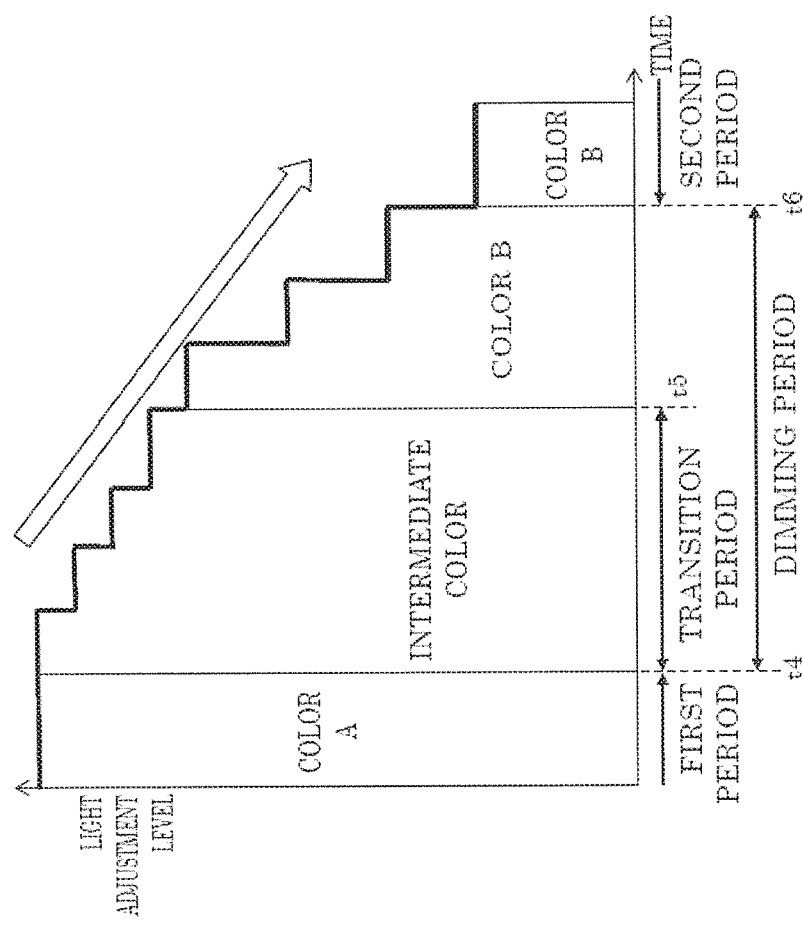

LED LIGHTING DEVICE AND LUMINAIRE

CROSS REFERENCE TO RELATED APPLICATION

This application claims the benefit of priority of Japanese Patent Application Number 2018-098547 filed on May 23, 2018, the entire content of which is hereby incorporated by reference.

BACKGROUND

1. Technical Field

The present disclosure relates to a light-emitting diode (LED) lighting device that causes LED loads, each having a different emission color, to emit light, and a luminaire.

2. Description of the Related Art

Japanese Unexamined Patent Application Publication No. 2004-311635 discloses an illumination device capable of dimming and toning by (i) causing LEDs, each having a different emission color, to be switched in a sequential order and to be lit up, and (ii) adjusting an intensity and mixture ratio of each emission color.

The illumination device as in the conventional technique is capable of toning. However, it is desired that the number of adjustable colors can easily be increased, i.e., an adjustable color resolution can easily be increased.

The present disclosure aims to provide an LED lighting device in which a resolution of toning can easily be increased, and a luminaire.

SUMMARY

In order to solve the above problem, a light-emitting diode (LED) lighting device in the present disclosure that causes LED loads, each having a different emission color, to emit light includes (i) a selector circuit that sequentially and cyclically selects the LED loads one by one, the LED loads respectively emitting light as a result of being selected and (ii) a control circuit that controls the selector circuit to cause an intermediate color to be produced by successively generating frames, each frame being a temporal combination of at least one first cycle period and at least one second cycle period, the at least one first cycle period in each of which the LED loads are sequentially selected one by one to generate a first; mixed emission color, and the at least one second cycle period in each of which the LED loads are sequentially selected one by one to generate a second mixed emission color different from the first mixed emission color.

A luminaire in the present disclosure includes the above LED lighting device and the LED loads.

The LED lighting device and the luminaire in the present disclosure make it possible to easily increase the resolution of the toning.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is an explanatory diagram showing an intermediate color during a toning transition period of the luminaire including the LED lighting device according to Embodiment 2;

FIG. 6 is an explanatory diagram showing a configuration example of frames during a transition period of the luminaire including the LED lighting device according to Embodiment 3;

FIG. 7A is an explanatory diagram showing a first operation example of the luminaire including the LED lighting device according to Embodiment 4;

FIG. 7B is an explanatory diagram showing a second operation example of the luminaire including the LED lighting device according to Embodiment 4;

FIG. 7C is an explanatory diagram showing a third operation example of the luminaire including the LED lighting device according to Embodiment 4;

FIG. 7D is an explanatory diagram showing a fourth operation example of the luminaire including the LED lighting device according to Embodiment 4;

FIG. 10B is an explanatory diagram showing the dimming period and the transition period during which the brightness is decreased of the luminaire including the LED lighting device according to Embodiment 7;

DETAILED DESCRIPTION OF THE EMBODIMENTS

The inventors have identified the following problem related to an illumination device described in the column "Background."

A luminaire according to the findings of the inventors will be described first as a comparative example.

Figure 12:
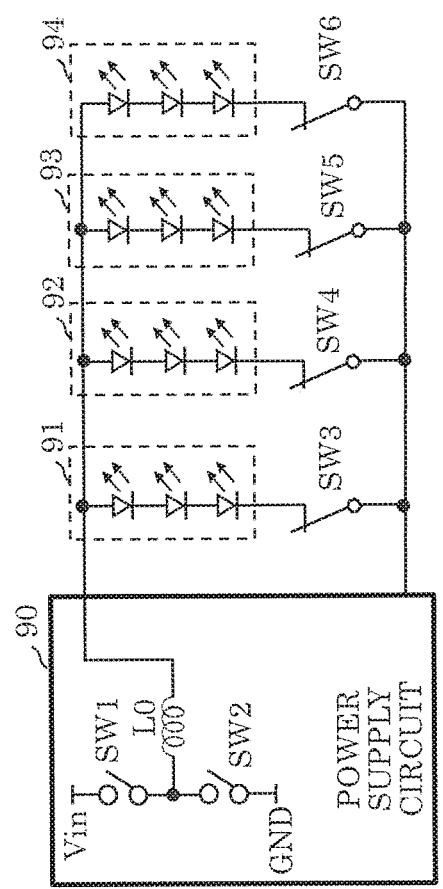
FIG. 12 is a diagram showing a configuration of a luminaire in a comparative example.

FIG. 12 is a diagram showing a configuration of the luminaire in the comparative example according to the findings of the inventors. The luminaire in the drawing includes power supply circuit 90, LED loads 91-94, and switching elements SW3-SW6. Power supply circuit 90 includes switching elements SW1 and SW2, and inductor L0, and is a so-called step-down converter-type direct current (DC)-DC converter. Switching elements SW1 and SW2 are switched off exclusively from each other. Inductor L0 stores and discharges energy supplied from the connection points of switching elements SW1 and SW2.

LED loads 91-94 each have different emission colors. The emission colors of LED loads 91-94 are red, green, blue, and white.

Switching elements SW3-SW6 are switched on sequentially within one cycle.

Figure 13:
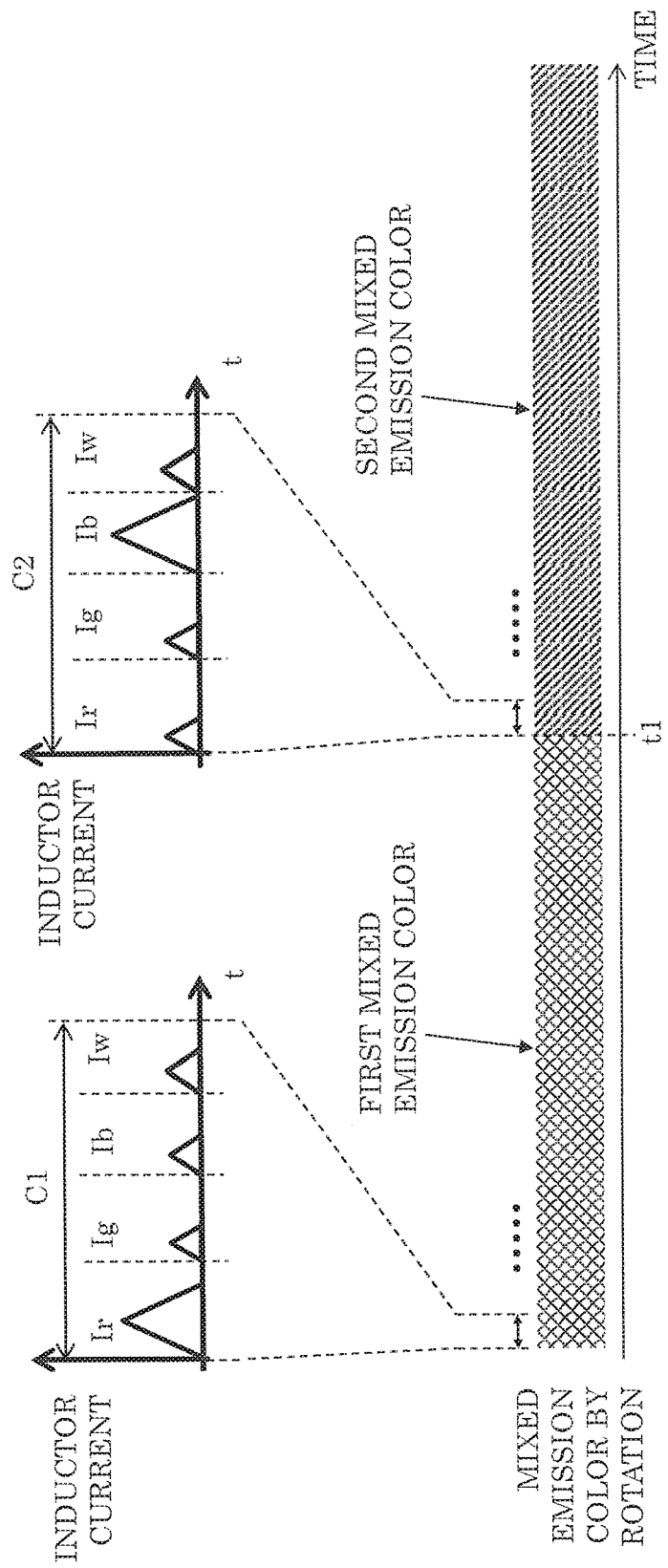
FIG. 13 is a diagram showing current waveforms and mixed emission colors of the luminaire in the comparative example.

FIG. 13 is a diagram showing current waveforms and mixed emission colors of the luminaire in the comparative example. The top part of the drawing shows inductor current waveforms during cycle C1 and inductor current waveforms during cycle C2. The horizontal axis in the drawing indicates time. The vertical axis in the top part of the drawing indicates the inductor current. The inductor current is output current of power supply circuit 90 supplied to any of the LED loads via inductor L0. Inductor current Ir is supplied from inductor L0 to the red LED load 91. Inductor current Ig is supplied from inductor L0 to the green LED load 92. Inductor current Ib is supplied from inductor L0 to the blue LED load 93. Inductor current Iw is supplied from inductor L0 to the white LED load 94.

Comparing cycle C1 and cycle C2, inductor current Ir corresponding to the red LED load 91 is higher in cycle C1 and inductor current Ib corresponding to the blue LED load 93 is higher in cycle C2. With this, the luminaire emits the first mixed emission color that is redder in cycle C1 and emits the second mixed emission color that is bluer in cycle C2.

The bottom part of the drawing shows an example of the toning of the luminaire. In the bottom part of the drawing, the luminaire emits the first mixed emission color that is closer to red up until time t1 and the second mixed emission color that is closer to blue from time t1. In other words, in this example, the color is changed at time t1.

There is, however, the following problem with such a luminaire.

First, it is difficult to easily increase the number of colors, i.e., easily generate optional colors, and to increase the resolution of the toning. The colors that the luminaire in FIGS. 12 and 13 can generate are determined by a blend ratio of each color of the LED loads, that each have a different emission color, in one cycle. Normally speaking, the colors (or color temperatures) required in accordance with the usage of the luminaire usually come preset. The toning is for selectively changing the colors within the preset color range. For example, when there are 10 adjustable colors, it is possible to change the colors selecting from the 10 colors. In this case, the resolution is 10 colors in terms of number of colors, and it is difficult to generate new colors other than these 10 colors. In other words, it is difficult to further increase the resolution.

Second, a change in color causes people discomfort when a color temperature and brightness difference between the first mixed emission color and the second mixed emission color are too large.

In order to solve such a problem, an LED lighting device according to an aspect of the present disclosure that causes LED loads, each having a different emission color, to emit light includes (i) a selector circuit that sequentially and cyclically selects the LED loads one by one, the LED loads respectively emitting light as a result of being selected and (ii) a control circuit that controls the selector circuit to cause an intermediate color to be produced by successively generating frames, each frame being a temporal combination of at least one first cycle period and at least one second cycle period, the at least one first cycle period in each of which the LED loads are selected sequentially one by one to generate a first mixed emission color, and the at least one second cycle period in each of which the LED loads are sequentially selected one by one to generate a second mixed emission color different from the first mixed emission color.

This makes it possible to easily increase the resolution of the toning by generated the above intermediate color with regard to the first problem. This also makes it possible to reduce the discomfort people experience when the above intermediate color is interposed between the first mixed emission color and the second mixed emission color during the toning with regard to the second problem.

Hereinafter, the embodiments in the present disclosure will be described in detail with reference to the drawings.

Note that each of the embodiments described below shows a comprehensive or specific example in the present disclosure. Numerical values, shapes, materials, components, placement and connection of the components, steps and their order, and the like are mere examples and are not intended to limit the present disclosure. Components in the following embodiments not mentioned in any of the independent claims that define the broadest concepts are described as optional elements.

Embodiment 1

(1.1 Configuration of LED Lighting Device and Luminaire)

A configuration example of a luminaire including an LED lighting device according to Embodiment 1 will first be described.

Figure 1:
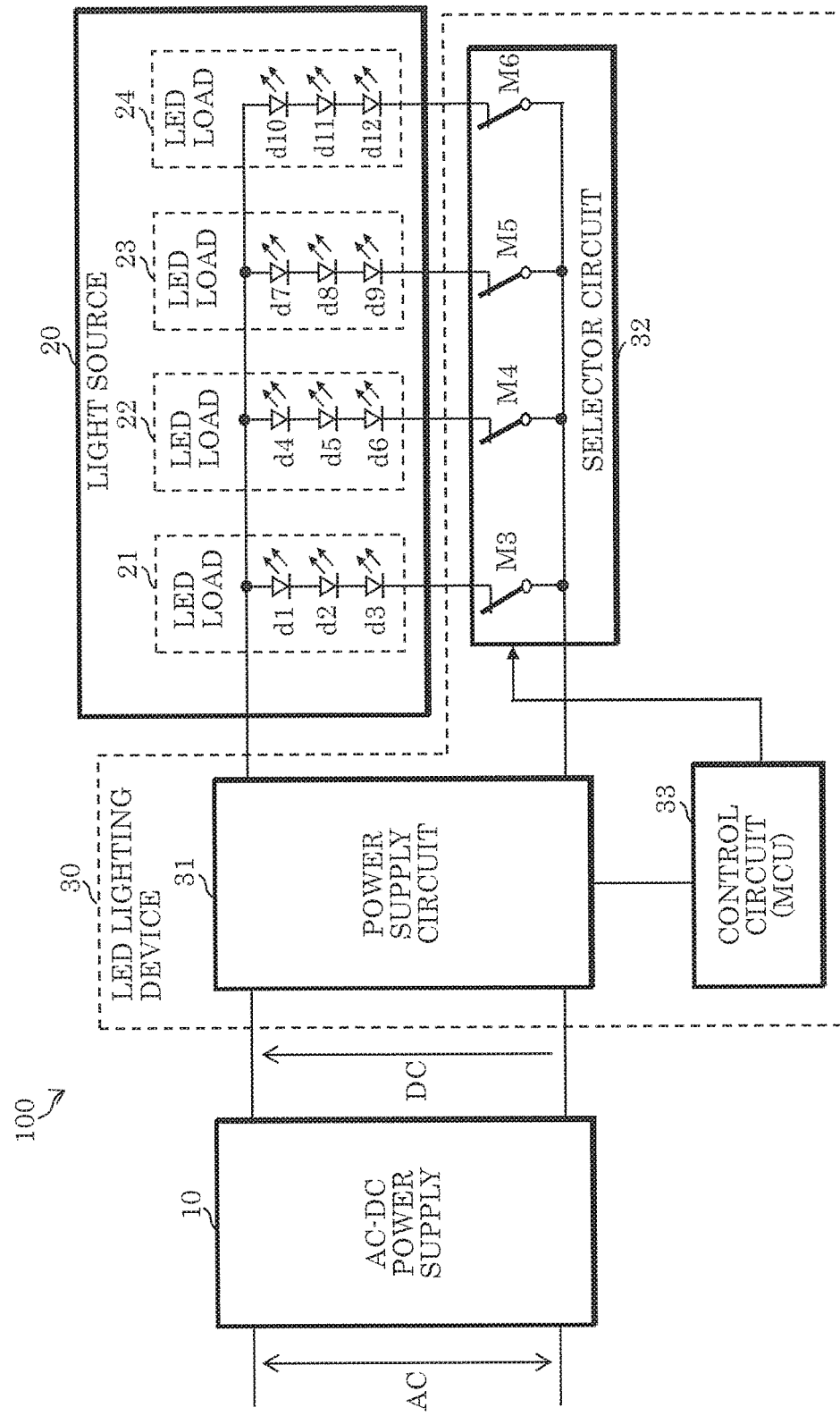
FIG. 1 is a block diagram showing a configuration example of a luminaire including an LED lighting device according to Embodiment 1.

FIG. 1 is a block diagram showing the configuration example of luminaire 100 including LED lighting device 30 according to Embodiment 1. Luminaire 100 in the drawing includes alternating current (AC)-DC power supply 10, light source 20, LED lighting device 30.

AC-DC power supply 10 is, for example, connected to a commercial 100 V power supply, is supplied with AC power and converts the AC power to DC power.

Light source 20 includes LED loads 21-24. LED loads 21-24 each have a different emission color. The emission colors of LED loads 21-24 are, for example, red (R), green (G), blue (B), and white (W).

LED lighting device 30 emits light with a mixed emission color including a preset plurality of colors (or color temperatures) by causing LED loads 21-24, which each have a different emission color, to sequentially and cyclically emit light. LED lighting device 30 includes power supply circuit 31, selector circuit 32, and control circuit 33 for this reason.

Power supply circuit 31 converts the DC power from AC-DC power supply 10 to DC power with a different voltage, and is a DC-DC converter that supplies the converted DC power to light source 20.

Selector circuit 32, by selecting one LED load from LED loads 21-24 in a sequential and cyclical order, causes power supply circuit 31 to supply electric power to the selected LED load. Selector circuit 32 includes switching elements M3-M6 for this reason. Switching elements M3-M6 are each connected in series to one LED load of LED loads 21-24. In FIG. 1, for example, switching element M3 is connected in series to LED load 21. Switching element M4 is connected in series to LED load 22. Switching element M5 is connected in series to LED load 23. Switching element M6 is connected in series to LED load 24. These switching elements M3-M6 are, for example, controlled to be switched on exclusively from one another. With this, LED loads 21-24 emit light exclusively, i.e., one at a time.

Control circuit 33 controls selector circuit 32 to sequentially and cyclically select LED loads 21-24 one by one. Control circuit 33 controls selector circuit 32 to cause an intermediate color to be produced by successively generating frames, each frame being a temporal combination of at least one first cycle period and at least one second cycle period, the at least one first cycle period in each of which LED loads 21-24 are sequentially selected one by one to generate a first mixed emission color, and the at least one second cycle period in each of which LED loads 21-24 are sequentially selected one by one generate a second mixed emission color different from the first mixed emission color.

The intermediate color will be described in more detail next.

Figure 2:
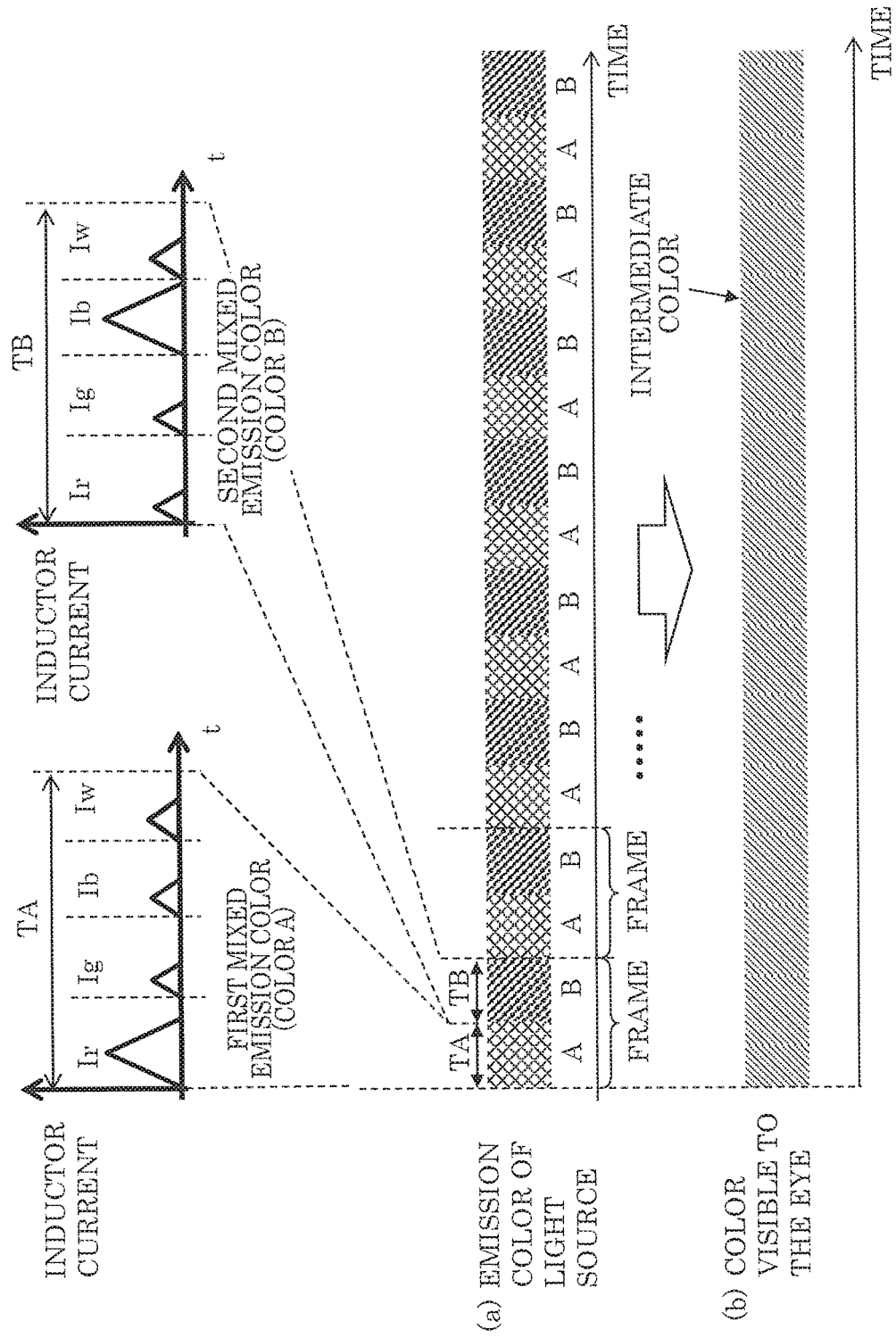
FIG. 2 is an explanatory diagram showing current waveforms, mixed emission colors, and an intermediate color of the luminaire including the LED lighting device according to Embodiment 1.

FIG. 2 is an explanatory diagram showing current waveforms, mixed emission colors, and the intermediate color of luminaire 100 including LED lighting device 30 according to Embodiment 1. The top part of the drawing shows an inductor current waveform during cycle period TA and an inductor current waveform during cycle period TB. The horizontal axis in the drawing indicates time. The vertical axis in the top part of the drawing indicates the inductor current. The inductor current is output current of power supply circuit 31 supplied to any of the LED load via inductor L1 in power supply circuit 31. Inductor L1 will be described later in FIG. 3. Inductor current Ir is supplied from inductor L1 to the red LED load 21. Inductor current Ig is supplied from inductor L1 to the green LED load 22. Inductor current Ib is supplied from inductor L1 to the blue LED load 23. Inductor current Iw is supplied from inductor L1 to the white LED load 24.

Comparing cycle period TA and cycle period TB, inductor current Ir corresponding to the red LED load 21 is higher in cycle period TA and inductor current Ib corresponding to the blue LED load 23 is higher in cycle period TB. With this, the luminaire emits a first mixed emission color that is redder in cycle period TA and emits a second mixed emission color that is bluer in cycle period TB. Hereinafter, the first mixed emission color is also referred to as color A and the second mixed emission color as color B. Cycle period TA is also referred to as first cycle period and cycle period TB as second cycle period.

The middle part in the drawing shows (a) emission color of light source 20. The bottom part of the drawing shows (b) color visible to the eye, i.e., the intermediate color. As illustrated in the middle part of the drawing, control circuit 33 controls selector circuit 32 to repeatedly generate frames. In the example of the drawing, the frames are a combination of one cycle period TA during which the first mixed emission color is generated, and one cycle period TB during which the second mixed emission color is generated. Frames here are a temporal combination of at least one first cycle period and at least one second cycle period, the at least one first cycle period in each of which LED loads 21-24 are sequentially selected one by one to generate a first mixed emission color, and the at least one second cycle period in each of which LED loads 21-24 are sequentially selected one by one to generate a second mixed emission color different from the first mixed emission color, and are a unit for defining one intermediate color. More generally, a frame is a lighting pattern that is temporal combination of at least one first cycle period and at least one second cycle period, and is a unit that defines one intermediate color. The number and positions of the first cycle periods and the number and positions of the second cycle periods within the frame can be optionally decided in accordance with a desired intermediate color.

As illustrated in the middle part of the drawing, the frames are repeatedly generated, and color A and color B are switched at a high speed. As a result, as illustrated in the bottom part of the drawing, the human eye sees color A and color B, mixed with a ratio of 1:1, as one intermediate color.

With such an intermediate color, a resolution of toning can be increased since colors that cannot be generated in one cycle period can now be generated.

A more concrete circuit example of luminaire 100 including LED lighting device 30 will be described next.

Figure 3:
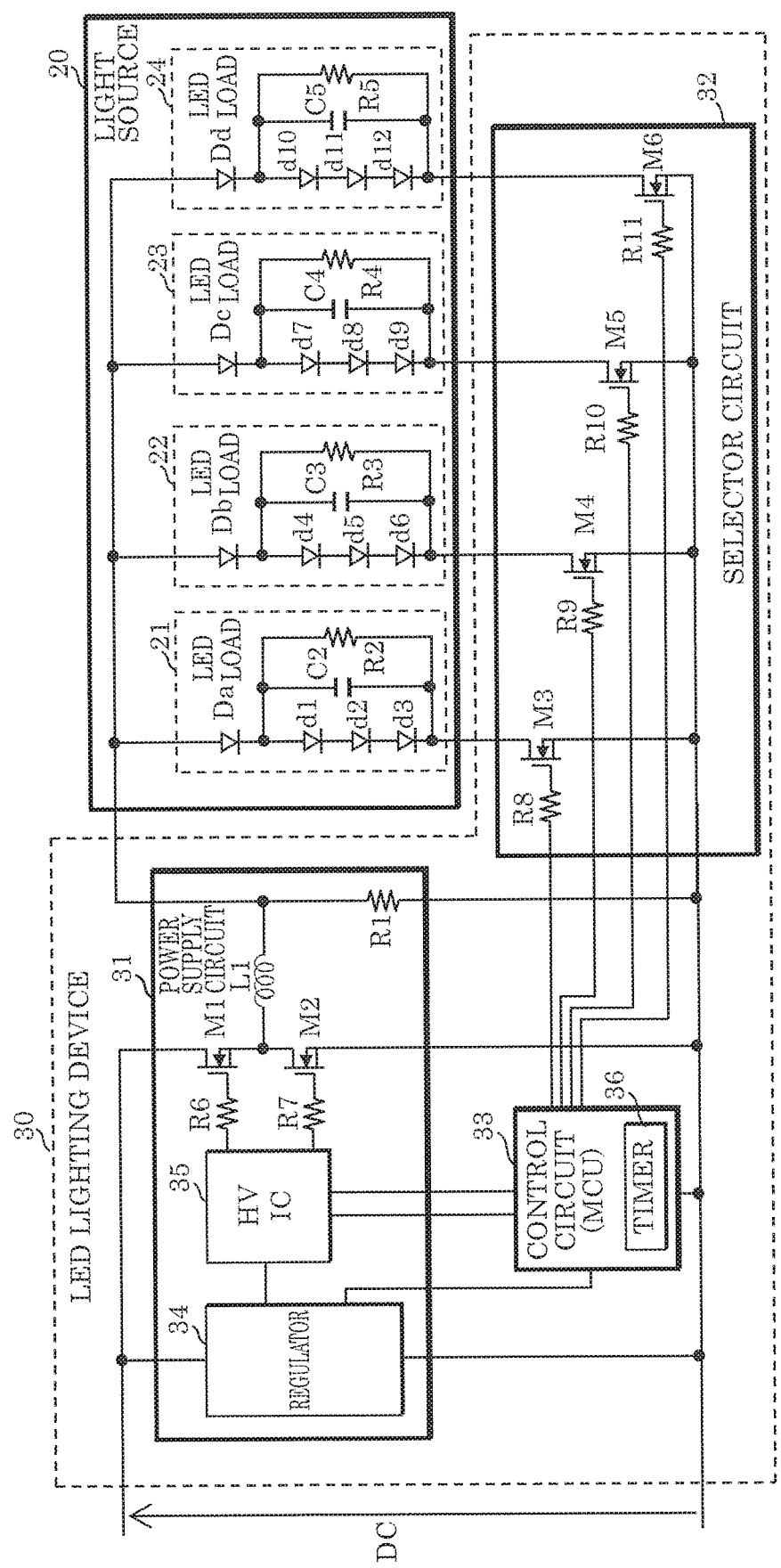
FIG. 3 is a block diagram showing a circuit configuration example of the luminaire including the LED lighting device according to Embodiment 1.

FIG. 3 is a block diagram showing the circuit configuration example of luminaire 100 including LED lighting device 30 according to Embodiment 1. As illustrated in FIG. 3, luminaire 100 includes light source 20 and LED lighting device 30. In FIG. 3, however, AC-DC power supply 10 shown in FIG. 1 is omitted.

LED load 21 in light source 20 is connected in series to switching element M3, is controlled to be lit up by switching element M3 being switched on and off, and more current is present and a light intensity increases the longer switching element M3 is switched on.

LED load 21 in FIG. 3 includes, as the more concrete circuit example, LEDs d1-d3, smoothing capacitor C2 connected in parallel to LEDs d1-d3, reverse current protection diode Da connected in series to a parallel circuit including LEDs d1-d3 and smoothing capacitor C2, and resistor R2 for discharging the current when the power supply is turned off.

LEDs d1-d3 are connected in series light-emitting elements with the same emission color, and are connected in series to switching element M3.

Smoothing capacitor C2 smoothens the inductor current supplied from inductor L1 via diode Da.

Diode Da prevents the current from smoothing capacitor C2 from flowing back to inductor L1. In other words, diode Da supplies an electric charge charged in smoothing capacitor C2 only to LEDs d1-d3.

Resistor R2 has a high resistance value and discharges the electric charge of smoothing capacitor C2 after the switching element M3 is switched from on to off.

LED loads 22-24 have the same configuration as LED load 21 except for the emission color thereof. Note that LED load 21 does not need to include at least one of smoothing capacitor C2, reverse current protection diode Da, and resistor R2 The same applies to LED loads 22-24.

Power supply circuit 31 in LED lighting device 30 is an example of a step-down chopper circuit in FIG. 3. To be specific, power supply circuit 31 includes regulator 34, high-voltage integrated circuit (HVIC) 35, input resistors R6 and R7, switching elements M1 and M2, and inductor L1.

Regulator 34 receives the DC power from AC-DC power supply 10 and supplies a stabilized power supply voltage to HVIC 35 and control circuit 33.

HVIC 35 supplies a gate signal to switching elements M1 and M2 via input resistor R6 and R7 in compliance with a control of control circuit 33. The gate signal of switching elements M1 and M2 becomes active at high speed, cyclically, and exclusively.

Switching elements M1 and M2 are a high-side transistor and a low-side transistor for mutually connecting a DC voltage supplied from AC-DC power supply 10 and a ground level to inductor L1.

Inductor L1 stores and discharges electric energy in accordance with the switching of switching elements M1 and M2.

Selector circuit 32 includes input resistors R8-R11 and switching elements M3-M6.

Switching element M3 is connected in series to LED load 21. A gate signal instructing switching element M3 to be switched on and off is input from control circuit 33 into a gate of switching element M3 via input resistor R8. Switching element M3 is switched on and off in accordance with the gate signal.

Switching elements M4-M6 are similar to switching element M3.

Control circuit 33 may also include a microcontroller unit or microcomputer unit (MCU) with a built-in processor, memory, and timer 36. Timer 36 measures various types of cyclical time. For example, the selection of LED loads 21-24 is used for measuring the cycle periods.

(1.2 Operation of LED Lighting Device and Luminaire)

An operation example of luminaire 100 including LED lighting device 30 according to Embodiment 1 will be described next.

Figure 4A:
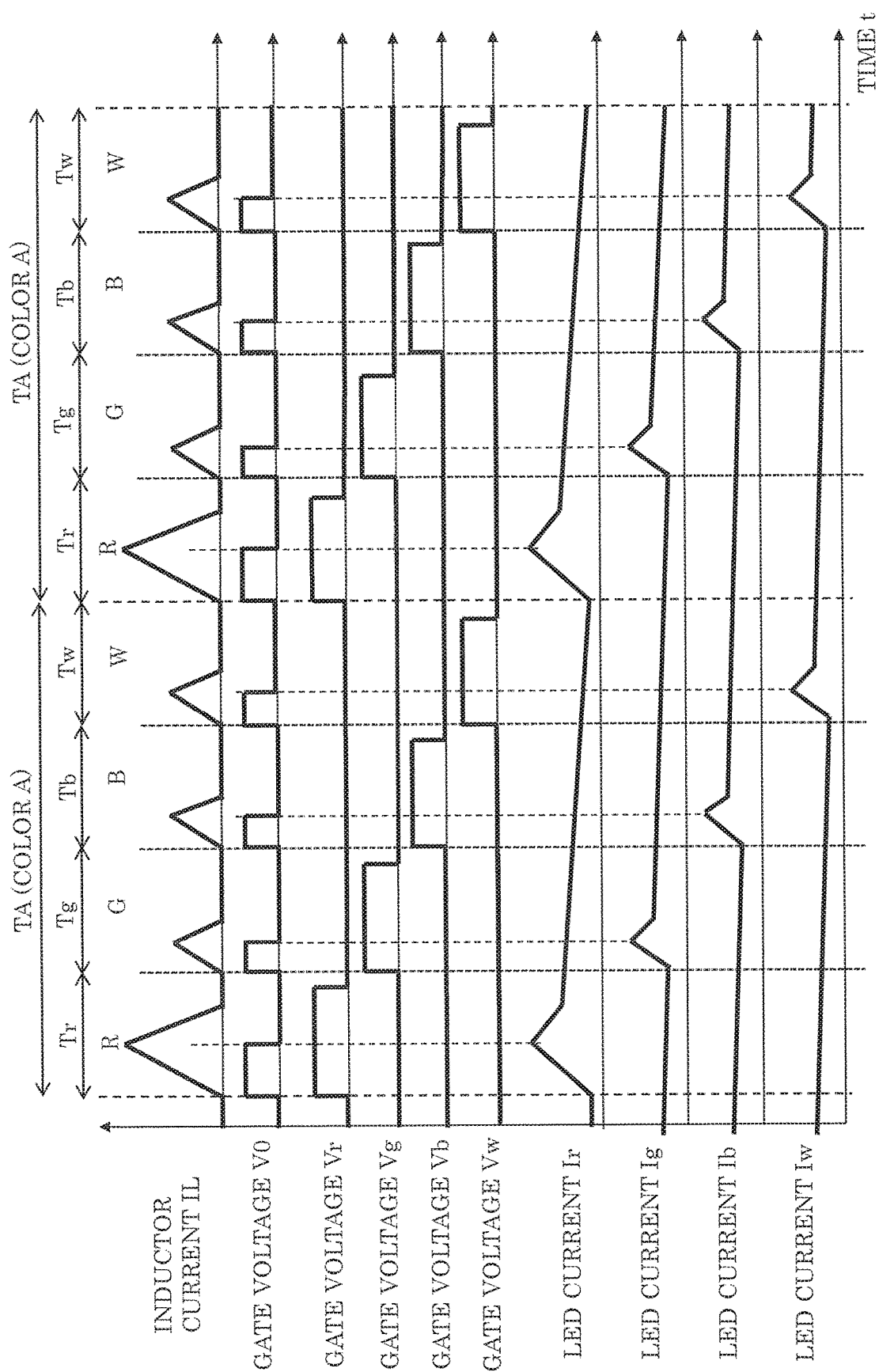
FIG. 4A is a diagram showing current waveforms and voltage waveforms of each part of the luminaire including the LED lighting device according to Embodiment 1.

FIG. 4A is a diagram showing current waveforms and voltage waveforms of each part of luminaire 100 including LED lighting 30 device according to Embodiment 1. The horizontal axis in the drawing indicates time. The vertical axis indicates current or voltage in each part of luminaire 100. Inductor current IL indicates the current flowing through inductor L1, i.e. the current supplied from power supply circuit 31 to any of the LED loads. The drawing shows two cycle periods TA corresponding to color A. In the drawing, cycle period TA has a fixed duration.

Cycle period TA is divided into the four periods Tr, Tg, Tb, and Tw, which is the same number as LED loads 21-24. In the drawing, these are four equal parts. Periods Tr, Tg, Tb, and Tw respectively correspond to red, green, blue, and white.

Gate voltage V0 indicates a voltage input from control circuit 33 to the gate of switching element M1 via HVIC 35. When gate voltage V0 is high, switching element M1 (i.e., high-side transistor) is switched on. Inductor current IL increases at high-level sections of gate voltage V0. At this time, inductor L1 stores electric energy as magnetic energy. When gate voltage V0 is low, switching element M1 is switched off. Right after switching element M1 is switched from on to off, inductor L1 discharges the stored energy, i.e., the stored energy is supplied to the LED loads while inductor current IL decreases to 0 due to a counter electromotive force of inductor L1. As a result, the electric supply section becomes longer than the high-level sections of gate voltage V0. Inductor current IL is a triangular wave in the drawing. The electric supply section, during which electricity is supplied from power supply circuit 31 to the LED load, is equal to a section of one triangular wave.

Gate voltage Vr indicates a voltage input from control circuit 33 to the gate of switching element M3. When gate voltage Vr is high, switching element M3 is switched on, i.e., the corresponding LED load 21 is selected. A high-level section of gate voltage Vr is controlled to include the high-level section of gate voltage V0 and be a period including the triangular wave of the corresponding inductor current IL. Gate voltages Vg, Vb, and Vw are similar to gate voltage Vr. Note that between the mutual high-level sections of gate voltages Vr, Vg, Vb, and Vw, a dead time is disposed during which the four gate voltages are low.

LED current Ir indicates the current flowing through LEDs d1-d3 inside LED load 21. After the electric supply section, i.e., after the electric supply from power supply circuit 31 to LED load 21 has finished, LED current Ir keeps flowing while decreasing without becoming 0. This depends on smoothing capacitor C2 and reverse current protection diode Da.

LED currents Ig, Ib, and Iw are similar to LED current Ir.

As illustrated in FIG. 4A, the inductor current amount, i.e., the light intensity is determined depending on a pulse width of gate voltage V0. The mixed emission color during cycle period TA is determined depending on a blend ratio of four colors R, G, B, and W. The blend ratio of the four colors R, G, B, and W is determined in accordance with a ratio of four pulse widths of gate voltage V0 in sections Tr, Tg, Tb, and Tw. In other words, the mixed emission color during the cycle period TA can be determined in accordance with the ratio of the four pulse widths of gate voltage V0. The number of adjustable colors is determined in accordance with a resolution of the four pulse widths of gate voltage V0 in sections Tr, Tg, Tb, and Tw. For example, when the four pulse widths of gate voltage V0 can be changed in two stages, $2^4$, i.e., 16 mixed emission colors can be generated. To generalize, when the four pulse widths of gate voltage V0 can respectively be changed at the Nr, Ng, Nb, and Nw stages, the mixed emission colors can be generated in accordance with (Nr×Ng×Nb×Nw). The number (or resolution) of mixed emission colors capable of being rendered during cycle period TA is determined as follows. Control circuit 33 generates a variety of mixed emission colors by controlling the four pulse widths of gate voltage V0.

Figure 4B:
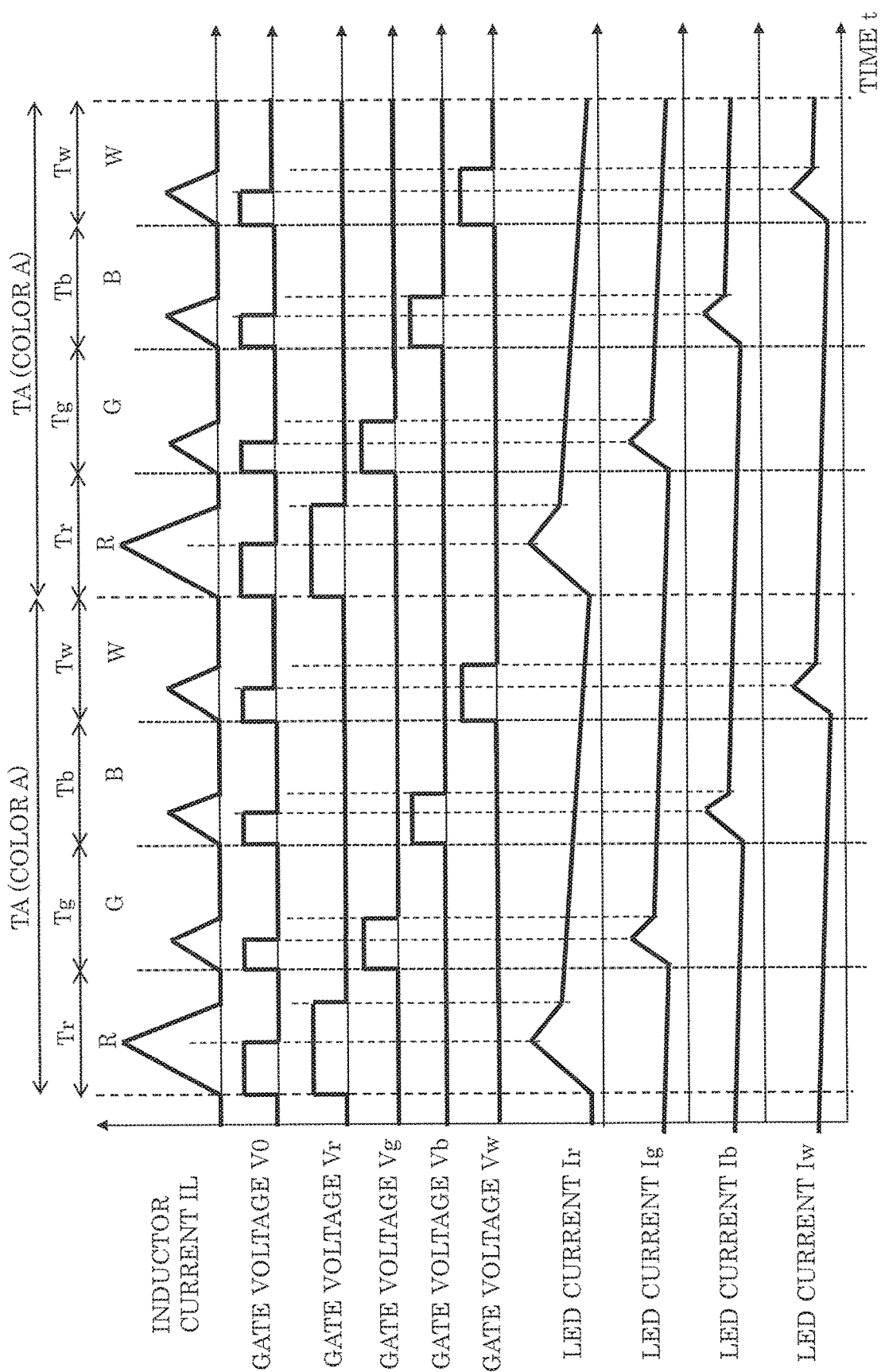
FIG. 4B is a diagram showing another example of current waveforms and voltage waveforms of each part of the luminaire including the LED lighting device according to Embodiment 1.

Note that gate voltages Vr, Vg, Vb, and Vw may be configured as in FIG. 4B instead of as in FIG. 4A. FIG. 4B is a diagram showing another example of current waveforms and voltage waveforms of each part of luminaire 100 including LED lighting device 30 according to Embodiment 1. In the example of FIG. 4B, the high-level sections of gate voltages Vr, Vg, Vb, and Vw have roughly the same width as one corresponding triangular wave. As a result, the dead times of gate voltages Vr, Vg, Vb, and Vw are longer than in FIG. 4A.

In the examples shown in FIGS. 4A and 4B, switching element M1 of power supply circuit 31 is controlled to be switched on within a period in which any of the LED loads is selected by selector circuit 32. In other words, the switching operation in power supply circuit 31, which is a switched-mode power supply, and the selecting operation in selector circuit 32 are synchronized.

As illustrated in the middle part and the bottom part of FIG. 2, LED lighting device 30 in the present embodiment not only has the colors that can be generated during a cycle period, but can also easily increase the number of colors visible to the eye, i.e. can easily increase the resolution of the colors since LED lighting device 30 can generate a intermediate color in the cycle period that is the same as color A or color B. Note that the intermediate color may be a color that cannot be rendered during the cycle, but may also be the same as colors that can be rendered during the cycle.

Note that the frames in the middle part of FIG. 2 may be too fast to be perceived by humans and cyclical. For example, the frame cycles may also be at most 10 ms. A frequency of the frame cycles, which is a reciprocal number, may be at least 100 Hz.

"Too fast to be perceived by humans and cyclical" here means "flicker not noticeable by humans." A measure against flicker in the LED lighting device is shown in, for example, a commentary on the Electrical Appliance and Material Safety Act (PSE), "Concerning the Order for Enforcement of the Electrical Appliances and Materials Safety Act (effective from Jul. 1, 2012)" (Product Safety Division, Commerce and Distribution Policy Group, Ministry of Economy, Trade and Industry). "Measure against flicker of optical output" on page 28 of the commentary explains the frequency that achieves the effect corresponding to "optical output in which no flicker is perceived" as follows. The commentary explains that in order to achieve "optical output in which no flicker is perceived," either one of (1) optical output with a repetition frequency of at least 100 Hz has no gaps, and (2) the repetition frequency is at least 500 Hz is necessary.

Luminaire 100 in the present embodiment must achieve the above (1) since the example in FIG. 4A shows no gaps in the optical output. In this case, the frequency of the reciprocal number of the frame cycle may be at least 100 Hz.

When luminaire 100 does not include smoothing capacitors C2-C5 and the like in FIG. 3, gaps in the optical output occur and the above (2) must be achieved. In this case, the frequency of the reciprocal number of the frame cycle may be at least 500 Hz.

As described above, LED lighting device 30 according to Embodiment 1 that causes LED loads 21-24, each having a different emission color, to emit light includes (i) selector circuit 32 that sequentially and cyclically selects LED loads 21-24 one by one, LED loads 21-24 respectively emitting light as a result of being selected, and (ii) control circuit 33 that controls selector circuit 32 to cause an intermediate color to be produced by successively generating frames, each frame being a temporal combination of at least one first cycle period and at least one second cycle period, the at least one first cycle period in each of which LED loads 21-24 are sequentially selected one by one to generate a first mixed emission color, and the at least one second cycle period in each of which LED loads 21-24 are sequentially selected one by one to generate a second mixed emission color different from the first mixed emission color.

This makes it possible to produce the intermediate color, which is visible to the human eye, between the first mixed emission color and the second mixed emission color. This intermediate color can be generated with a higher resolution than the toning resolution during a light-emitting cycle since the intermediate color is determined by the combination of the first cycle period and the second cycle period in the frames.

A duration of each of the frames may be at most 10 msec.

This makes it possible to mere reliably reduce flicker in the generated intermediate color.

LED lighting device 30 may include a switched-mode power supply (power circuit 31) that supplies electric power to the LED loads.

This makes it possible to perform the light-emitting cycle of LED loads 21-24 with high efficiency due to the combination of power supply circuit 31 and selector circuit 32.

Control circuit 33 may cause the switching operation in power supply circuit 31, which is a switched-mode power supply, and the selecting operation in selector circuit 32 to synchronize.

Luminaire 100 according to Embodiment 1 includes the above LED lighting device and LED loads 21-24.

LED loads 21-24 each include at least one LED (e.g. d1-d3), smoothing capacitor C2 connected in parallel to the at least one LED, and reverse current protection diode Da connected in series to a parallel circuit including the at least one LED and smoothing capacitor C2.

This makes it possible to elongate the period during which each LED load is effectively lit up more than the electric supply period due to the smoothing effect, and flicker can be made to occur less easily.

Embodiment 2

An example in which the intermediate color in Embodiment 1 is interposed during the toning is described in Embodiment 2.

(2.1 Configuration of LED Lighting Device and Luminaire)

A configuration of luminaire 100 according to Embodiment 2 may be the same as in FIGS. 1 and 3. However, a control of selector circuit 32 by control circuit 33 differs. The present embodiment will be described with focus on the following difference.

Control circuit 33 performs the following control in addition to the control in Embodiment 1. Control circuit 33 controls selector circuit 32 to set a first period during which the first cycle period is repeated, a second period during which the second cycle period is repeated, and a transition period between the first period and the second period during which light having the intermediate color is emitted.

(2.2 Operation of LED Lighting Device and Luminaire)

An operation example of luminaire 100 including LED lighting device 30 according to Embodiment 2 will be described next.

FIG. 5 is an explanatory diagram showing the intermediate color during the toning transition period in luminaire 100 including LED lighting device 30 according to Embodiment 2.

The top part of FIG. 5 shows the inductor currents during cycle period TB and cycle period TA similar to the top part of FIG. 2.

The middle part of FIG. 5 shows (a) emission color of light source 20, and a change in the emission color during the toning. The bottom part of the drawing shows (b) colors visible to the eye, i.e., the change in color during the toning. As illustrated in the middle part of the drawing, control circuit 33 controls selector circuit 32 to generate the intermediate color during the transition period in which the first mixed emission color (color A) is changed into the second mixed emission color (color B). In other words, in the example of the drawing, luminaire 100 emits color A due to the repetition of cycle period TA during the first period before the toning. Luminaire 100 emits the intermediate color that is a mix of color B and color A with a ratio of 1:1 during the transition period. Luminaire 100 emits color B due to the repetition of cycle period TB during the second period.

As illustrated in the bottom part of the drawing, the illuminating light is, to the human eye, temporarily changed from color A to the intermediate color and then further changed to color B. In the bottom part of the drawing, it is possible to change the color more smoothly than compared to when changing color A to color B, and less discomfort is caused to the human eye.

As described above, in LED lighting device 30 according to Embodiment 2, control circuit 33 controls selector circuit 32 to set a first period during which first cycle period TA is repeated, a second period during which second cycle period TB is repeated, and a transition period between the first period and the second period during which light having the intermediate color is emitted.

This makes it possible to change the color smoothly by interposing the intermediate color between the first mixed emission color and the second mixed emission color when adjusting the color from the first mixed emission color to the second mixed emission color.

Note that luminaire 100 may receive a toning instruction from an operation panel or a controller. The operation panel includes, for example, a slide button or a rotating button, receives a toning operation through an operation from the user, and notifies luminaire 100 to change color A, which is the current emission color, to color B. The controller can, for example, configure schedule data for temporally designating a brightness and color, and scene data for designating the brightness and brightness. The controller notifies luminaire 100 to change color A, which is the current emission color, to color B in compliance with this data. At this time, the controller may also transmit a command for designating the duration of the transition period to luminaire 100. The controller may also, for example, transmit a command for designating the second mixed emission color after the toning, and the duration of the transition period to luminaire 100. In this case, the first mixed emission color is the current emission color and the command can be omitted.

Embodiment 3

An example in which a plurality of intermediate colors are generated during the transition period, in contrast with Embodiment 2, is described in Embodiment 3.

(3.1 Configuration of LED Lighting Device and Luminaire)

A configuration of luminaire 100 according to Embodiment 3 may be the same as in FIGS. 1 and 3. However, a control of selector circuit 32 by control circuit 33 differs. The present embodiment will be described with focus on the following difference.

Control circuit 33 performs the following control in addition to the control in Embodiment 2. Control circuit 33 controls the frames so that they include, during the transition period, a first frame type and a second frame type, the first frame type including more of the first cycle periods than the second cycle period, and the second frame type including more of the second cycle periods than the first cycle period. During the transition period, the first frame type temporally precedes the second frame type.

(3.2 Operation of LED Lighting Device and Luminaire)

An operation example of luminaire 100 including lighting device 30 according to Embodiment 3 will be described next.

FIG. 6 is an explanatory diagram showing a configuration example of frames during the transition period of luminaire 100 including LED lighting device 30 according to Embodiment 3.

The top part of the drawing shows frames f61-65 that are a plurality of types. The bottom part of the drawing shows an example of repeatedly generating frames during the transition period interposed between the first period and the second period.

In the top part of the drawing, the squares with the letter A in frames f61-f65 indicate cycle period TA and the squares with the letter B indicate cycle period TB shown in FIG. 5. Frames f61-f65 represent the intermediate color between color A and color B, but the blend ratios of color A and color B differ. Frame f61 indicates an intermediate color being a mix of color A and color B with a ratio of 5:1. Frame f62 indicates an intermediate color being a mix of color A and color B with a ratio of 4:2. Similarly, frames f63, f64, and f65 respectively indicate a mix of color A and color B with a ratio of 3:3, 2:4, and 1:5. In this manner, in frames f61-f65, the blend ratio of color A becomes smaller and the blend ratio of color B becomes larger in this order. Note that frame 61 or 62 corresponds to the above first frame type. Frame 64 or 65 corresponds to the above second frame type.

As illustrated in the bottom part of the drawing, during the transition period, frame f61 is repeated n1 time, frame f62 is repeated n2 times, and frames f63, f64, and f65 are similarly respectively repeated n3, n4, and n5 times. For example, when the transition period is approximately five seconds, n1-n5 may also be set so that each repetition period of frames f61-f65 is approximately one second.

With this, the blend ratio of color A becomes smaller and the blend ratio of color B becomes larger as time passes in the transition period. In other words, a plurality of gradually changing intermediate colors can be interposed when the color is adjusted from color A to color B. Luminaire 100 in present embodiment can be adjusted more smoothly than luminaire 100 in Embodiment 2.

As described above, in LED lighting device 30 according to Embodiment 3, (i) the frames include a first frame type and a second frame type, the first frame type including more of the first cycle periods than the second cycle period, and the second frame type including more of the second cycle periods than the first cycle period, the first cycle periods each being the first cycle period, and (ii) during the transition period, the first frame type temporally precedes the second frame type.

This makes it possible to make the color change more smoothly compared to when there is one intermediate color since a plurality of intermediate colors is generated during the transition period.

Note that n1-n5 in FIG. 6 do not need to be uniform and may also be non-uniform. For example, the intermediate color of frame f63 can be accentuated by making n3 occur more times than the rest.

Frames f61-f65 include six cycle periods, but may also include another number of cycle periods besides six. Frames f61-f65 have the same duration in FIG. 6, but may also have different durations.

Embodiment 4

An example in which the duration of the transition period is changed in accordance with the brightness or color temperature, in contrast with Embodiment 2, is described in Embodiment 4.

(4.1 Configuration of LED Lighting Device and Luminaire)

A configuration of luminaire 100 according to Embodiment 4 may be the same as in FIGS. 1 and 3. However, a control of selector circuit 32 by control circuit 33 differs. The present embodiment will be described with focus on the following difference.

Control circuit 33 performs the following control in addition to the control in Embodiment 2. Control circuit 33 changes a duration of the transition period in accordance with at least one of a brightness of the first mixed emission color and a brightness of the second mixed emission color. For example, control circuit 33 sets the transition period longer as a brightness of the second mixed emission color is lower. For example, control circuit 33 sets the transition period longer as one of a color temperature difference and a brightness difference between the first mixed emission color and the second mixed emission color is smaller.

(4.2 Operation of LED Lighting Device and Luminaire)

A first operation example of luminaire 100 including LED lighting device 30 according to Embodiment 4 will be described next.

FIG. 7A is an explanatory diagram showing the first operation example of the luminaire including the LED lighting device according to Embodiment 4. In image (a) of the drawing, transition period Ta is interposed when adjusting the color from color A to color B. In image (b) of the drawing, the color is the same as in image (a), but the brightness is different. In image (b) of the drawing, transition period Tb is longer than transition period Ta.

In the drawing, control circuit 33 determines a correlation between (i) the brightness of color A, which is the first mixed emission color, and the brightness of color B, which is the second mixed emission color, and (ii) first threshold value Th1.

As a result, when control circuit 33 determines that at least one of the brightness of color A and the brightness of color B is greater than first threshold value Th1, control circuit 33 selects the shorter transition period Ta. When control circuit 33 determines that both the brightness of color A and the brightness of color B are smaller than first threshold value Th1, control circuit 33 selects the longer transition period Tb. Note that when both the brightness of color A and the brightness of color B are equal to first threshold value Th1, control circuit 33 may select either one of transition periods Ta and Tb for the transition period.

In this example, the transition period is set longer when the two colors before and after the toning are darker than first threshold value Th1. This makes it possible to set the transition period longer the darker the illumination light is during the toning, and to change the color more smoothly.

Note that in FIG. 7A, control circuit 33 may compare the brightness of only one of color A and color B to the threshold value and not compare the brightness of the other to the threshold value.

A second operation example in Embodiment 4 will be described next.

FIG. 7B is an explanatory diagram showing the second operation example of the luminaire including the LED lighting device according to Embodiment 4. In image (a) of the drawing, transition period Ta is interposed when adjusting the color from color A to color B. In image (b) of the drawing, the color is the same as in image (a), but the brightness is different. In image (b) of the drawing, transition period Tb is longer than transition period Ta.

In the drawing, control circuit 33 (i) calculates the difference between the brightness of color A, which is the first mixed emission color, and the brightness of color B, which is the second mixed emission color, and (ii) determines a correlation between the difference and second threshold value Th2. As a result, when control circuit 33 determines that the difference is greater than second threshold value Th2, control circuit 33 selects the shorter transition period Ta. When control circuit 33 determines that the difference is smaller than second threshold value Th2, control circuit 33 selects the longer transition period Tb. Note that when the difference is equal to second threshold value Th2, control circuit 33 may select either one of transition periods Ta and Tb for the transition period.

In this example, the transition period is set longer when the difference between the brightness of the two colors before and after the toning is smaller than second threshold value Th2. This makes it possible to set the transition period longer the smaller the change in brightness is before and after the toning, and to change the color more smoothly.

A third operation example in Embodiment 4 will be described next.

FIG. 7C is an explanatory diagram showing the third operation example of the luminaire including the LED lighting device according to Embodiment 4. The drawing differs in that the color temperatures of the colors are compared to a threshold value instead of comparing the brightness of the colors, in contrast with FIG. 7A. The present embodiment will be described with focus on the following difference.

In FIG. 7C, control circuit 33 determines a correlation between (i) the color temperature of color A, which is the first mixed emission color, and the color temperature of color B, which is the second mixed emission color, and (ii) third threshold value Th3.

As a result, when control circuit 33 determines that at least one of the color temperature of color A and the color temperature of color B is greater than third threshold value Th3, control circuit 33 selects the shorter transition period Ta. When control circuit 33 determines that both the color temperature of color A and the color temperature of color B are smaller than third threshold value Th3, control circuit 33 selects the longer transition period Tb. Note that when both the color temperature of color A and the color temperature of color B are equal to third threshold value Th3, control circuit 33 may select either one of transition periods Ta and Tb for the transition period.

In this example, the transition period is set longer when the two color temperatures before and after the toning are lower than third threshold value Th3. This makes it possible to set the transition period longer the lower the color temperature of the illumination light is during the toning, and to change the color more smoothly.

Note that in FIG. 7C, control circuit 33 may compare the color temperature of only one of color A and color B to the threshold value and not compare the color temperature of the other to the threshold value.

A fourth operation example in Embodiment 4 will be described next.

FIG. 7D is an explanatory diagram showing the fourth operation example of the luminaire including the LED lighting device according to Embodiment 4. The drawing differs in that a difference in the color temperatures of the colors is compared to a threshold value instead of comparing the difference between the brightness of the colors, in contrast with FIG. 7B. The present embodiment will be described with focus on the following difference.

In FIG. 7D, control circuit 33 (i) calculates the difference between the color temperature of color A, which is the first mixed emission color, and the color temperature of color B, which is the second mixed emission color, and (ii) determines a correlation between the difference and fourth threshold value Th4. As a result, when control circuit 33 determines that the difference is greater than second threshold value Th4, control circuit 33 selects the shorter transition period Ta. When control circuit 33 determines that the difference is smaller than second threshold value Th4, control circuit 33 selects the longer transition period Tb. Note that when the difference is equal to second threshold value Th4, control circuit 33 may select either one of transition periods Ta and Tb for the transition period.

In this example, the transition period is set longer when the difference between the two color temperatures before and after the toning is smaller than fourth threshold value Th4. This makes it possible to set the transition period longer the smaller the change in color temperature is before and after the toning, and to change the color more smoothly.

As described above, in LED lighting device 30 in according to Embodiment 4, control circuit 33 changes the duration of the transition period in accordance with at least one of the brightness of the first mixed emission color and the brightness of the second mixed emission color.

This makes it possible to change the color more smoothly in transition periods with different durations in accordance with the brightness.

Control circuit 33 may set the transition period longer as a brightness of the second mixed emission color is lower.

This makes it possible to reduce discomfort due to a sudden change in color especially in situations where the illumination light is dark.

Control circuit 33 may set the transition period longer as one of a color temperature difference and a brightness difference between the first mixed emission color and the second mixed emission color is smaller.

This makes it possible to change the color smoothly especially when the change in color before and after the toning is small.

Note that the examples of FIGS. 7A to 7D show the selection from the two transition periods Ta and Tb with different durations, but there may also be selected from three or more transition period with different durations. In this case, control circuit 33 may select from a plurality of transition periods using a plurality of threshold values in accordance with the brightness or color temperature. Control circuit 33 may also be capable of changing the duration of the transition period in accordance with one of the brightness of the first mixed emission color and the brightness of the second mixed emission color.

Embodiment 5

An example in which a plurality of intermediate colors are generated during the transition period similar to the example in Embodiment 3, and frames are set longer as the brightness of the second mixed emission color is lower is described in Embodiment 5.

(5.1 Configuration of LED Lighting Device and Luminaire)

A configuration of luminaire 100 according to Embodiment 5 may be the same as in FIGS. 1 and 3. However, a control of selector circuit 32 by control circuit 33 differs. The present embodiment will be described with focus on the following difference.

Control circuit 33 performs the following control in addition to the control in Embodiment 3. Control circuit 33 sets the frames longer as the brightness of the second mixed emission color is lower.

(5.2 Operation of LED Lighting Device and Luminaire)

An operation example of luminaire 100 including LED lighting device 30 according to Embodiment 5 will be described next.

Figure 8:
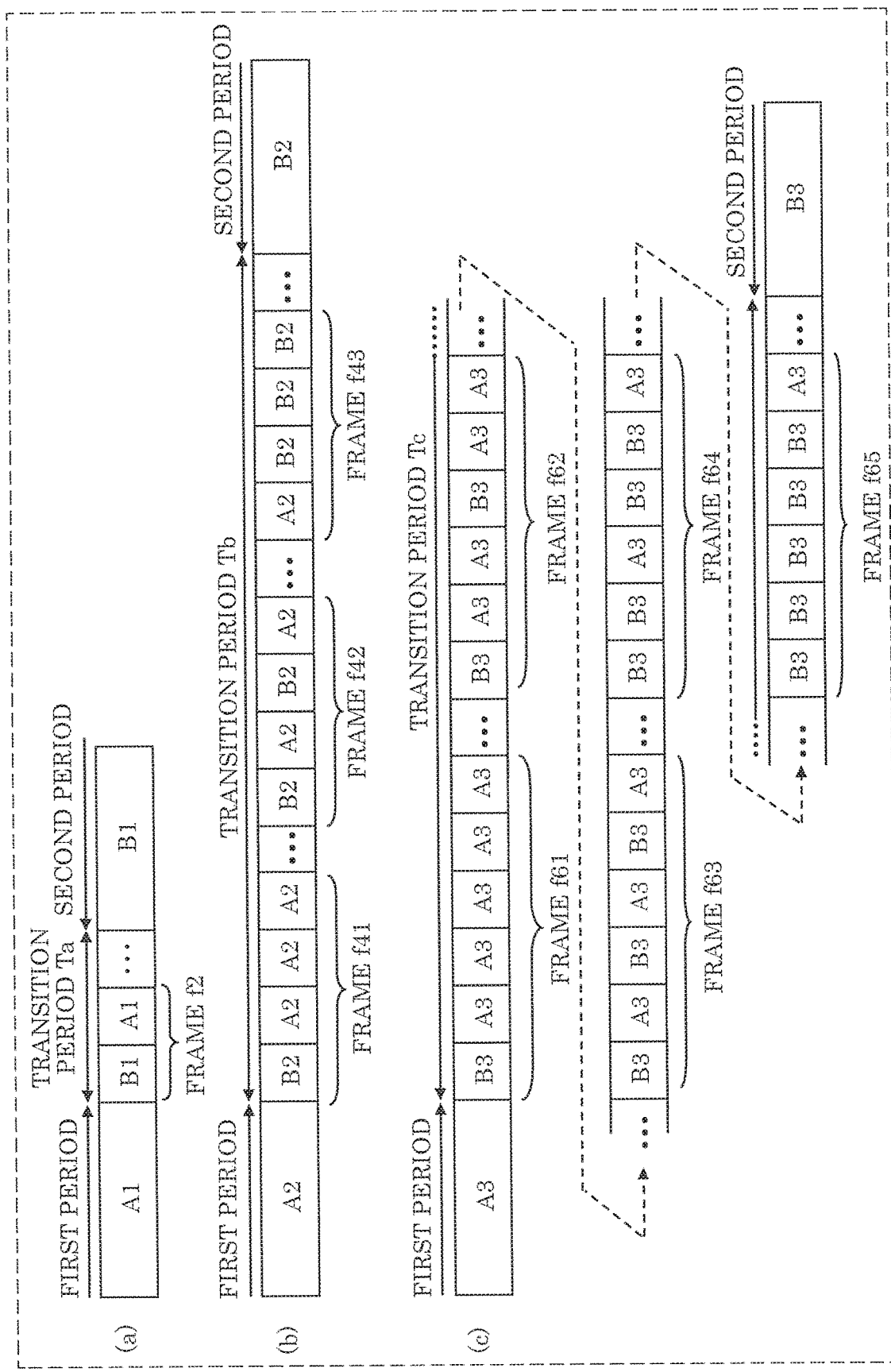
FIG. 8 is an explanatory diagram showing multiple types of frames during transition periods in the luminaire including the LED lighting device according to Embodiment 5.

FIG. 8 is an explanatory diagram showing multiple types of frames during transition periods of the luminaire including the LED lighting device according to Embodiment 5 Images (a), (b), and (c) of the drawing show frame configurations of transition periods Ta, Tb, and Tc interposed between the first period and the second period before and after the toning. Color B1 in image (a), color B2 in image (b), and color B3 in image (c) of the drawing are the same color and are made to be darker in this order. In this case, transition periods Ta, Tb, and Tc become longer in this order. The frames also become longer in this order. In other words, frames f61-f65 are longer than frames f41-43. Frames f41-43 are longer than frame f21. In this manner, control circuit 33 sets the frames longer as a brightness of the second mixed emission color after the toning is lower.

Transition period Ta in image (a) of the drawing shows an example in which there is one type of frame f21 and one intermediate color.

Transition period Tb in image (b) of the drawing shows an example in which there are three types of frames f41-f43 and three intermediate colors. In frames f41-f43, the mixture ratio of the second mixed emission color becomes larger as transition period Tb progresses. In other words, the three intermediate colors gradually change from color A2 to color B2.

Transition period Tc in image (c) of the drawing shows an example in which there are five types of frames f61-f65 and five intermediate colors. In frames f61-f65, the mixture ratio of the second mixed emission color becomes larger as transition period Tc progresses. In other words, the five intermediate colors gradually change from color A3 to color B3.

As described above, LED lighting device 30 according to Embodiment 5, control circuit 33 sets the frames longer as a brightness of the second mixed emission color is lower.

This makes it possible to increase the number of colors that can be rendered as the intermediate color as illuminating light becomes darker.

Note that, as illustrated in FIG. 8, control circuit 33 may set the frames longer as the transition period is longer. The number of intermediate colors can easily be increased when the frames are set longer. "Setting the frames longer" here refers to prolonging the duration of the lighting pattern that is a temporal combination of the first cycle period in which the first mixed emission color is generated and the second cycle period in which the second mixed emission color is generated. In FIG. 8, for example, the frames are set longer in the order of frame f2 in image (a), frame 41 in image (b), and frame 61 in image (c).

Embodiment 6

An example in which a ratio of the first cycle period and the second cycle period included in the frames during the transition period is made to be dependent on the second mixed emission color, and made to differ from each other.

(6.1 Configuration of LED Lighting Device and Luminaire)

A configuration of luminaire 100 according to Embodiment 6 may be the same as in FIGS. 1 and 3. However, a control of selector circuit 32 by control circuit 33 differs. The present embodiment will be described with focus on the following difference.

Control circuit 33 performs the following control in addition to the control in Embodiment 2. Control circuit 33 causes, during the transition period, a ratio between the first cycle period during which color A is generated and the second cycle periods during which color B is generated included in the frames to depend on the second mixed emission color (or color temperature). The frames included in the transition period are a temporal combination of the at least one first cycle period and the at least one second cycle period. Making the above mixture ratio dependent on the second mixed emission color (or color temperature) means bringing the intermediate color closer to the second mixed emission color.

(6.2 Operation of LED Lighting Device and Luminaire)

An operation example of luminaire 100 including LED lighting device 30 according to Embodiment 6 will be described next.

Figure 9:
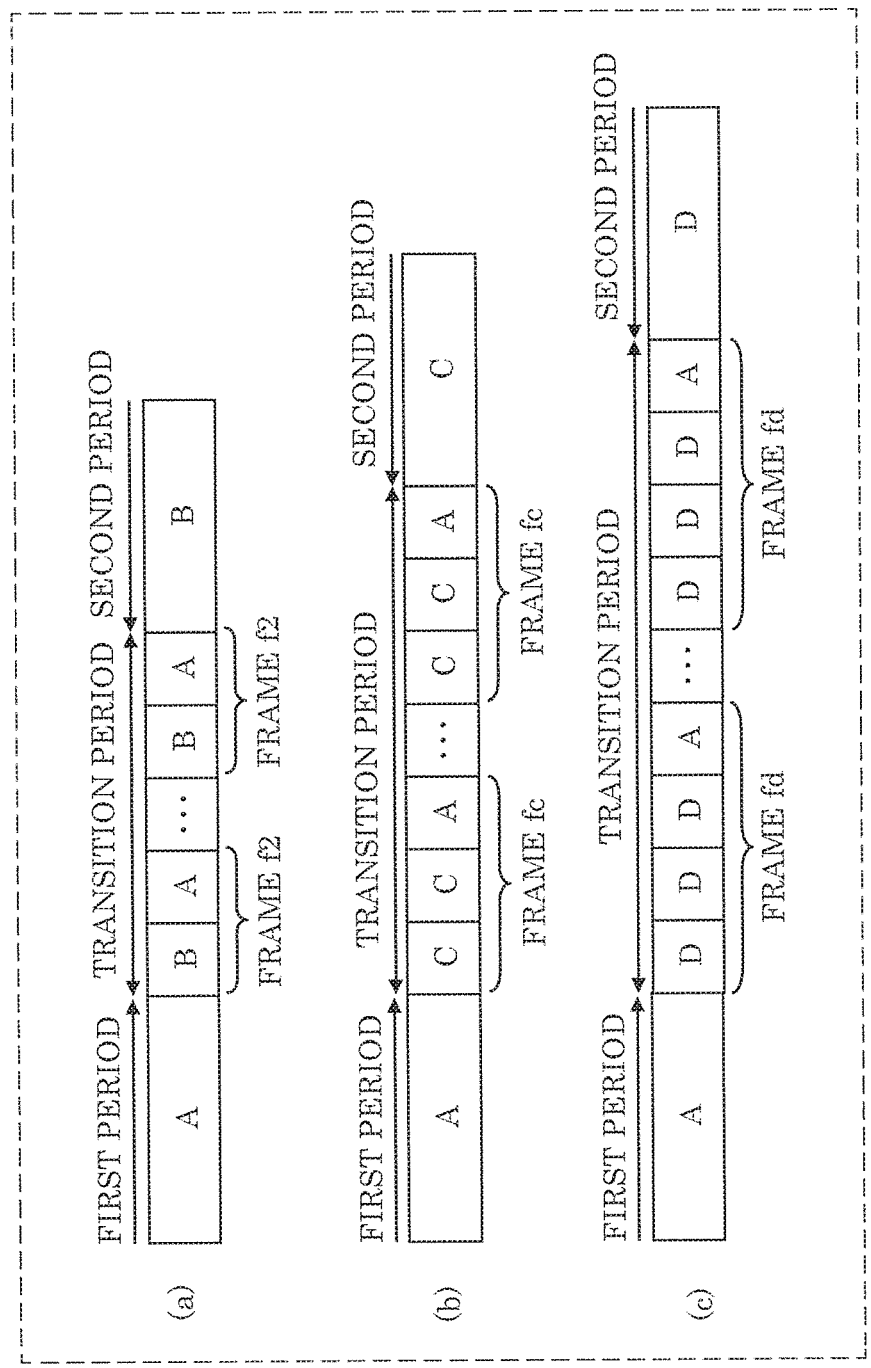
FIG. 9 is an explanatory diagram showing an intermediate color during transition periods in the luminaire including the LED lighting device according to Embodiment 6.

FIG. 9 is an explanatory diagram showing the intermediate color during transition periods of the luminaire including the LED lighting device according to Embodiment 6.

In image (a) of the drawing, the first mixed emission color is color A and the second mixed emission color is color B. The mixture ratio between color B and color A in frame f2, which defines the intermediate color, is 1:1.

In image (b) of the drawing, the first mixed emission color is color A and the second mixed emission color is color C. The mixture ratio between color C and color A in frame fc, which defines the intermediate color, is 2:1. This intermediate color is closer to color C than color A.

In image (c) of the drawing, the first mixed emission color is color A and the second mixed emission color is color D. The mixture ratio between color D and color A in frame fd, which defines the intermediate color, is 3:1. This intermediate color is closer to color D than color A.

When the color temperatures of color B, color C, and color D in the drawing are low to high in this order, the color with the highest color temperature will be emphasized. When the color temperatures of color B, color C, and color D in the drawing are high to low in this order, the color with the lowest color temperature will be emphasized.

As described above, LED lighting device 30 according to Embodiment 6, the frames are a temporal combination of the at least one first cycle period and the at least one second cycle period, and a ratio between the at least one of the first cycle periods and the at least one of the second cycle periods included in the frames differs depending on the second mixed emission color.

This makes it possible to make the colors change more smoothly and decrease discomfort since the intermediate color is made to be dependent on the second mixed emission color, which is the color after the toning.

Embodiment 7

An example in which the toning, during which the color is caused to change, and the dimming, during which the brightness is caused to change, are executed simultaneously is described in Embodiment 5.

(7.1 Configuration of LED Lighting Device and Luminaire)

A configuration of luminaire 100 according to Embodiment 7 may be the same as in FIG. 1 and FIG. 3. However, a control of selector circuit 32 by control circuit 33 differs. The present embodiment will be described with focus on the following difference.

Control circuit 33 performs the following control in addition to the control in Embodiment 1. Control circuit 33 controls selector circuit 32 (i) sets a first period during which first cycle period TA is repeated, a second period during which second cycle period TB is repeated, and, when a brightness of the first mixed emission color during the first cycle and a brightness of the second mixed emission color during the second cycle differ, a dimming period during which a brightness is gradually caused to change between the first period and the second period, and (ii) controls selector circuit 32 to set a transition period, during which light having the intermediate color is emitted, within the dimming period. Control circuit 33 sets the transition period shorter than the dimming period. At this time, control circuit 33 controls (i) one of a relative starting time and a duration of the transition period within the dimming period when the brightness is gradually increased and (ii) one of a relative starting time and a duration of the transition period within the dimming period when the brightness is gradually decreased, to cause (i) and (ii) to be different.

(7.2 Operation of LED Lighting Device and Luminaire)

An operation example of luminaire 100 including LED lighting device 30 according to Embodiment 7 will be described next.

Figure 10A:
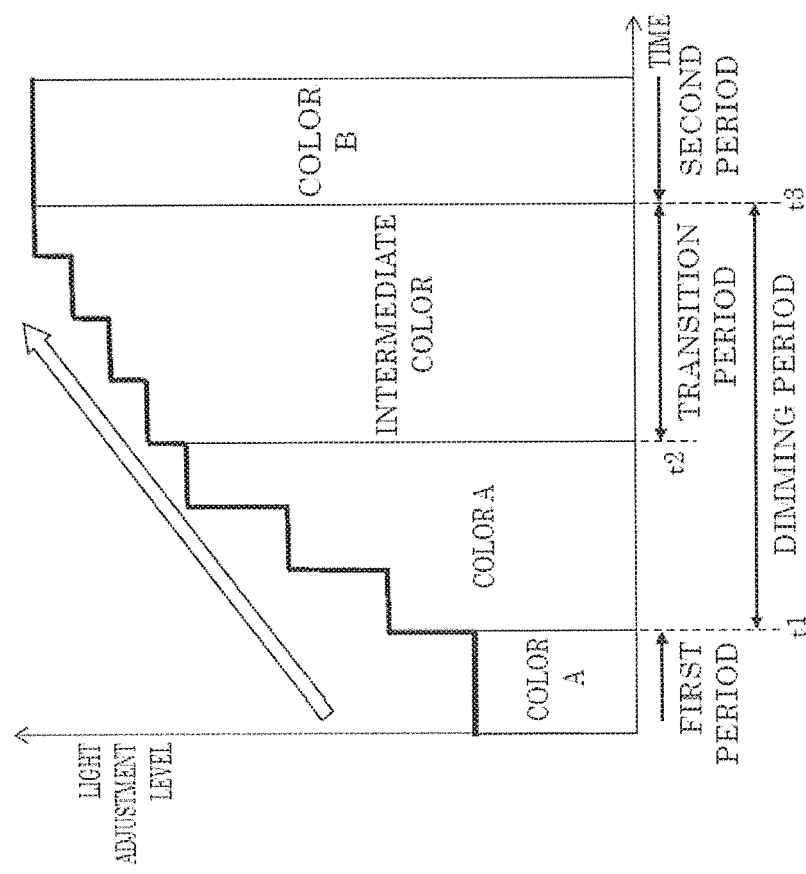
FIG. 10A is an explanatory diagram showing a dimming period and a transition period during which a brightness is increased of the luminaire including the LED lighting device according to Embodiment 7.

FIG. 10A is an explanatory diagram showing the dimming period and the transition period during which the brightness is increased of the luminaire including the LED lighting device according to Embodiment 7. The horizontal axis in the drawing indicates time and the vertical axis indicates dimming level, i.e., brightness. A dimming period is set during which a brightness is gradually caused to increase between the first period and the second period, i.e., from time t1 to time t3. A period from time t2 to time t3, which is shorter than the diming period, includes the transition period during which the intermediate color is produced. Time t3 and onwards includes the second period during which color B is emitted. Control circuit 33 causes the brightness to gradually increase during the entire dimming period (i.e., from time t1 to time t3). At this time, the emission color from time t1 to time t2 remains color A as in the first period. Control circuit 33 causes the intermediate color to be generated from time t2 to time t3, which is the transition period. Control circuit 33 causes the brightness to gradually increase during the transition period as well. Control circuit 33 further causes color B to be generated during time t3. In this manner, in FIG. 10A, control circuit 33 disposes the transition period to be in a brighter portion within the dimming period.

FIG. 10B is an explanatory diagram showing the dimming period and the transition period during which the brightness is decreased of the luminaire including the LED lighting device according to Embodiment 7. The horizontal axis in the drawing indicates time and the vertical axis indicates dimming level, i.e., brightness. A dimming period is set during which a brightness is gradually caused to decrease between the first period and the second period, i.e., from time t4 to time t6. A period from time t4 to time t5, which is shorter than the dimming period, includes the transition period during which the intermediate color is produced. Control circuit 33 causes color B, which is the same as in the second period, to be emitted from time t5 to time t6. Control circuit 33 gradually causes the brightness to decrease during the entire dimming period (i.e., from time t4 to time t6). At this time, the emission color from time t4 to time t5 is the intermediate color. Control circuit 33 causes the intermediate color to be generated from time t4 to time t5, which is the transition period. Control circuit 33 causes the brightness to gradually decrease during the transition period as well. Control circuit 33 further causes color B to be generated during time t5. In this manner, in FIG. 10B as well, control circuit 33 disposes the transition period to be in a brighter portion within the dimming period.

Control circuit 33 may control (i) one of a relative starting time and a duration of the transition period within the dimming period when the brightness is gradually increased and (ii) one of a relative starting time and a duration of the transition period within the dimming period when the brightness is gradually decreased, to cause (i) and (ii) to be different.

In FIGS. 10A and 10B, the starting times of each of the transition periods within the dimming period differ relatively. The relative starting time of the transition period is midway the dimming period in FIG. 10A and the starting time of dimming period in FIG. 10B. The duration of the transition period within the dimming period is different as well. The duration of the transition period is t3-t2 in FIG. 10A and t5-t4 in FIG. 10B.

According to FIGS. 10A and 10B, the discomfort due to the change in brightness and color can be reduced even more when the toning and the dimming are executed simultaneously.

As described above, LED lighting device 30 according to Embodiment 7, control circuit 33 (i) sets a first period during which the first cycle period is repeated, a second period during which the second cycle period is repeated, and a dimming period during which a brightness is gradually caused to change between the first period and the second period, and (ii) controls selector circuit 32 to set a transition period, during which light having the intermediate color is emitted, within the dimming period. The transition period is shorter than the dimming period.

This makes it possible to add various effects to the change in brightness and color since the transition period is shorter than the dimming period when the toning and the dimming are executed simultaneously.

Control circuit 33 may control (i) one of a relative starting time and a duration of the transition period within the dimming period when the brightness is gradually increased and (ii) one of a relative starting time and a duration of the transition period within the dimming period when the brightness is gradually decreased, to cause (i) and (ii) to be different.

This makes it possible to reduce the discomfort due to the change in brightness and color when the toning and the dimming are executed simultaneously.

Embodiment 8

An example of luminaire 100 including LED lighting device 30 according to each of the above embodiments will be described in Embodiment 8 with reference to FIGS. 11A to 11C.

Figure 11A:
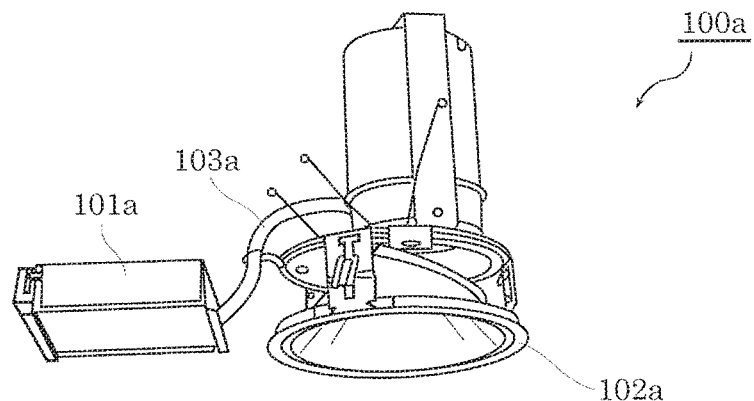
FIG. 11A is a diagram showing an exterior example of the luminaire including the LED lighting device according to each of the embodiments.

FIG. 11A is a diagram showing an exterior example of luminaire 100 including LED lighting device 30 according to each of the embodiments. FIG. 11A shows an exterior of downlight 100a as an example of luminaire 100.

Downlight 100a includes circuit box 101a, light body 102a, and wiring 103a. Circuit box 101a houses the entirety or a portion of LED lighting device 30 according to each of the above embodiments. Light body 102a is fitted with light source 20. Wiring 103a electrically connects circuit box 101a and light source 20 inside light body 102a.

Figure 11B:
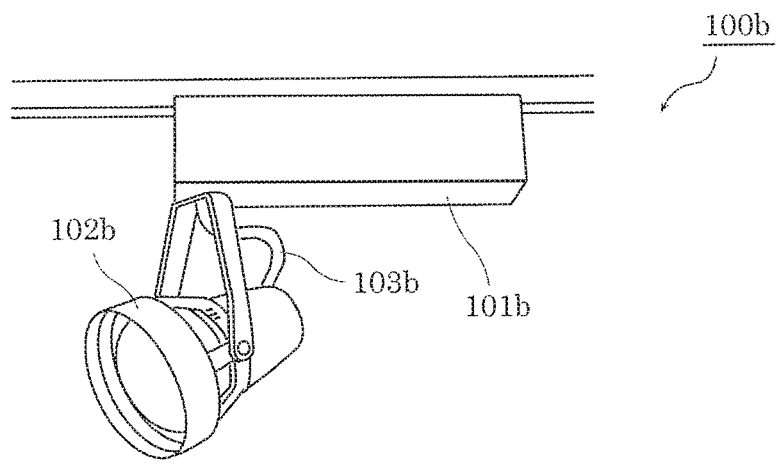
FIG. 11B is a diagram showing another exterior example of the luminaire including the LED lighting device according to each of the embodiments.

FIG. 11B is a diagram showing another exterior example of luminaire 100 including LED lighting device 30 according to each of the embodiments. FIG. 11B shows an exterior of spotlight 100b as an example of luminaire 100. Spotlight 100b includes circuit box 101b, light body 102b, and wiring 103b. These circuit box 101b, light body 102b, and wiring 103b are similar to circuit box 101a, light body 102a, and wiring 103a in FIG. 11A.

Figure 11C:
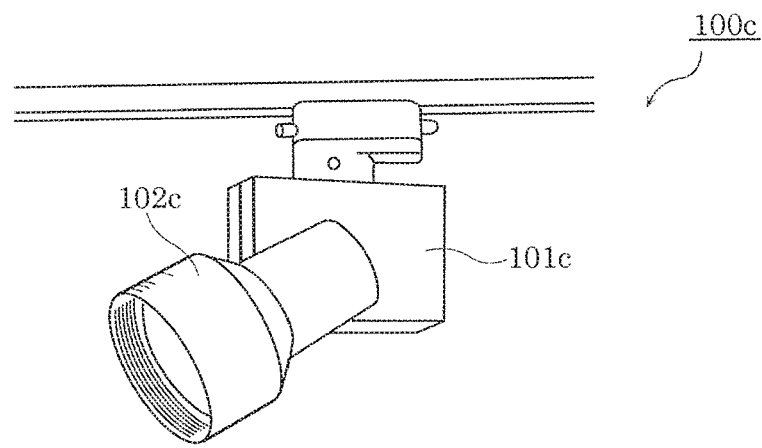
FIG. 11C is a diagram showing yet another exterior example of the luminaire including the LED lighting device according to each of the embodiments.

FIG. 11C is a diagram showing yet another exterior example of luminaire 100 including LED lighting device 30 according to each of the embodiments. FIG. 11B shows an exterior of spotlight 100c as an example of luminaire 100. Spotlight 100c includes circuit box 101c and light body 102c. These, too, are similar to circuit box 101a and light body 102b in FIG. 11A.

The same results as each of the above embodiments are achieved in Embodiment 8 as well.

Note that LEDs d1-d12 inside light source 20 are not only so-called LEDs, but may also be solid-state light-emitting elements, e.g. organic light-emitting diodes (OLED) or laser LEDs.

A LED lighting device according to one or a plurality of aspects in the present disclosure have been described above based on the embodiments, but the present disclosure is not limited to the foregoing. Forms obtained by various combinations of the components in the different embodiments that can be conceived by a person skilled in the art which are within the scope of the essence of the present disclosure may also be included in the scope of the one or more aspects of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light-emitting diode (LED) lighting device that causes a plurality of LED loads, each having a different emission color, to emit light, the LED lighting device comprising:

a selector circuit that sequentially and cyclically selects the plurality of LED loads one by one, the plurality of LED loads respectively emitting light as a result of being selected; and a control circuit that controls the selector circuit to cause an intermediate color to be produced by successively generating frames, each frame being a temporal combination of at least one first cycle period and at least one second cycle period, the at least one first cycle period in each of which the plurality of LED loads are sequentially selected one by one to generate a first mixed emission color, and the at least one second cycle period in each of which the plurality of LED loads are sequentially selected one by one to generate a second mixed emission color different from the first mixed emission color.

2. The LED lighting device according to claim 1, wherein the control circuit controls the selector circuit to set a first period during which the at least one first cycle period is repeated, a second period during which the at least one second cycle period is repeated, and a transition period between the first period and the second period during which light having the intermediate color is emitted.

3. The LED lighting device according to claim 2, wherein the control circuit changes a duration of the transition period in accordance with at least one of a brightness of the first mixed emission color and a brightness of the second mixed emission color.

4. The LED lighting device according to claim 2, wherein the control circuit sets the transition period longer as a brightness of the second mixed emission color is lower.

5. The LED lighting device according to claim 2, wherein the control circuit sets the transition period longer as one of a color temperature difference and a brightness difference between the first mixed emission color and the second mixed emission color is smaller.

6. The LED lighting device according to claim 2, wherein the frames include a first frame type and a second frame type, the first frame type including more of the at least one first cycle period than the at least one second cycle period, and the second frame type including more of the at least one second cycle period than the at least one first cycle period, and during the transition period, the first frame type temporally precedes the second frame type.

7. The LED lighting device according to claim 2, wherein the control circuit sets the frames longer as a brightness of the second mixed emission color is lower.

8. The LED lighting device according to claim 2, wherein a ratio between the at least one of the first cycle periods and the at least one of the second cycle periods included in the frames differs depending on the second mixed emission color.

9. The LED lighting device according to claim 1, wherein the control circuit (i) sets a first period during which the at least one first cycle period is repeated, a second period during which the at least one second cycle period is repeated, and, when a brightness of the first mixed emission color during the first cycle and a brightness of the second mixed emission color during the second cycle differ, a dimming period during which a brightness is gradually caused to change between the first period and the second period, and (ii) controls the selector circuit to set a transition period, during which light having the intermediate color is emitted, within the dimming period, and the transition period is shorter than the dimming period.

10. The LED lighting device according to claim 9, wherein the control circuit configures the transition period within the dimming period as a relatively bright period.

11. The LED lighting device according to claim 9, wherein the control circuit controls (i) one of a relative starting time and a duration of the transition period within the dimming period when the brightness is gradually increased and (ii) one of a relative starting time and a duration of the transition period within the dimming period when the brightness is gradually decreased, to cause (i) and (ii) to be different.

12. The LED lighting device according to claim 1, wherein a duration of each of the frames is at most 10 msec.

13. The LED lighting device according to claim 1, further comprising:

a switched-mode power supply that supplies electric power to the plurality of LED loads.

14. A luminaire, comprising:

the LED lighting device according to claim 1; and the plurality of LED loads.

15. The luminaire according to claim 14, wherein the plurality of LED loads each include:

at least one LED;

a smoothing capacitor connected in parallel to the at least one LED; and a reverse current protection diode connected in series to a parallel circuit including the at least one LED and the smoothing capacitor.

* * * * *